United States Patent [19]
Kitajima

[11] Patent Number: 5,978,076
[45] Date of Patent: Nov. 2, 1999

[54] REFERENCE LIGHT GENERATOR

[75] Inventor: Eiichi Kitajima, Yokohama, Japan

[73] Assignee: Nikon Corporation, Tokyo, Japan

[21] Appl. No.: 09/015,500

[22] Filed: Jan. 29, 1998

[30] Foreign Application Priority Data

Jan. 29, 1997 [JP] Japan .................................... 9-015342

[51] Int. Cl.⁶ .......................... G01B 11/26; G01B 11/00; G01C 5/00
[52] U.S. Cl. ............... 356/138; 356/139.06; 356/139.07; 356/400; 33/290
[58] Field of Search .............................. 356/138, 139.05, 356/139.06, 139.07, 139.08, 139.1, 148, 248, 363, 359, 399, 400

[56] References Cited

U.S. PATENT DOCUMENTS

| | | | |
|---|---|---|---|
| 4,792,228 | 12/1988 | Haffner .................................... | 356/400 |
| 5,033,847 | 7/1991 | Hamblin et al. ......................... | 356/143 |
| 5,272,814 | 12/1993 | Key ......................................... | 356/138 |
| 5,500,524 | 3/1996 | Rando ..................................... | 356/138 |
| 5,838,431 | 11/1998 | Hara et al. .............................. | 356/138 |
| 5,894,370 | 4/1999 | Okuda et al. ........................... | 356/138 |

OTHER PUBLICATIONS

Patent Abstracts of Japan: 63–222214, Sep. 1988, TOGA.
Patent Abstracts of Japan: 08075466, Mar. 1996, Kitajima.
Patent Abstracts of Japan: 08240431, Sep. 1996, Kitajima.
Patent Abstracts of Japan: 08240432, Sep. 1996, Kitajima.
Noriyuki Toga, "Reference Beam Correcting Radiator For Surveying Instrument", 2–126111, Appl. No. 63–279690, May 15, 1990.

*Primary Examiner*—Frank G. Font
*Assistant Examiner*—Roy M. Punnoose
*Attorney, Agent, or Firm*—Pillsbury Madison & Sutro LLP

[57] ABSTRACT

A reference light generator that is capable of switching the scan plane of a laser beam between the horizontal and the vertical simply by changing the installation position of the reference light generator.

A laser beam is emitted from a laser diode 1. A half mirror 3 guides the laser beam to transparent containers 5 and 7. When the reference light generator is used to determine the degree of horizontality, it is installed so that the transparent container 5 is positioned at the top. In this case, a movable light shielding plate 4 blocks the laser beam that travels toward the transparent container 7. The prism effect of a silicon oil 71 inside the transparent container 5 corrects the inclination of the laser beam that passes through the silicon oil 71. A rotation-type pentagonal prism 9 emits only the inclination-corrected laser beam from the reference light generator. When the reference light generator is used to determine the degree of verticality, it is installed so that the transparent container 7 is positioned at the bottom. In this case, the movable light shielding plate 4 blocks the laser beam that travels toward the transparent container 5. The prism effect of a silicon oil 72 inside the transparent container 7 corrects the inclination of the laser beam that passes through the silicon oil 72. The rotation-type pentagonal prism 9 emits only the inclination-corrected laser beam from the reference light generator.

14 Claims, 15 Drawing Sheets

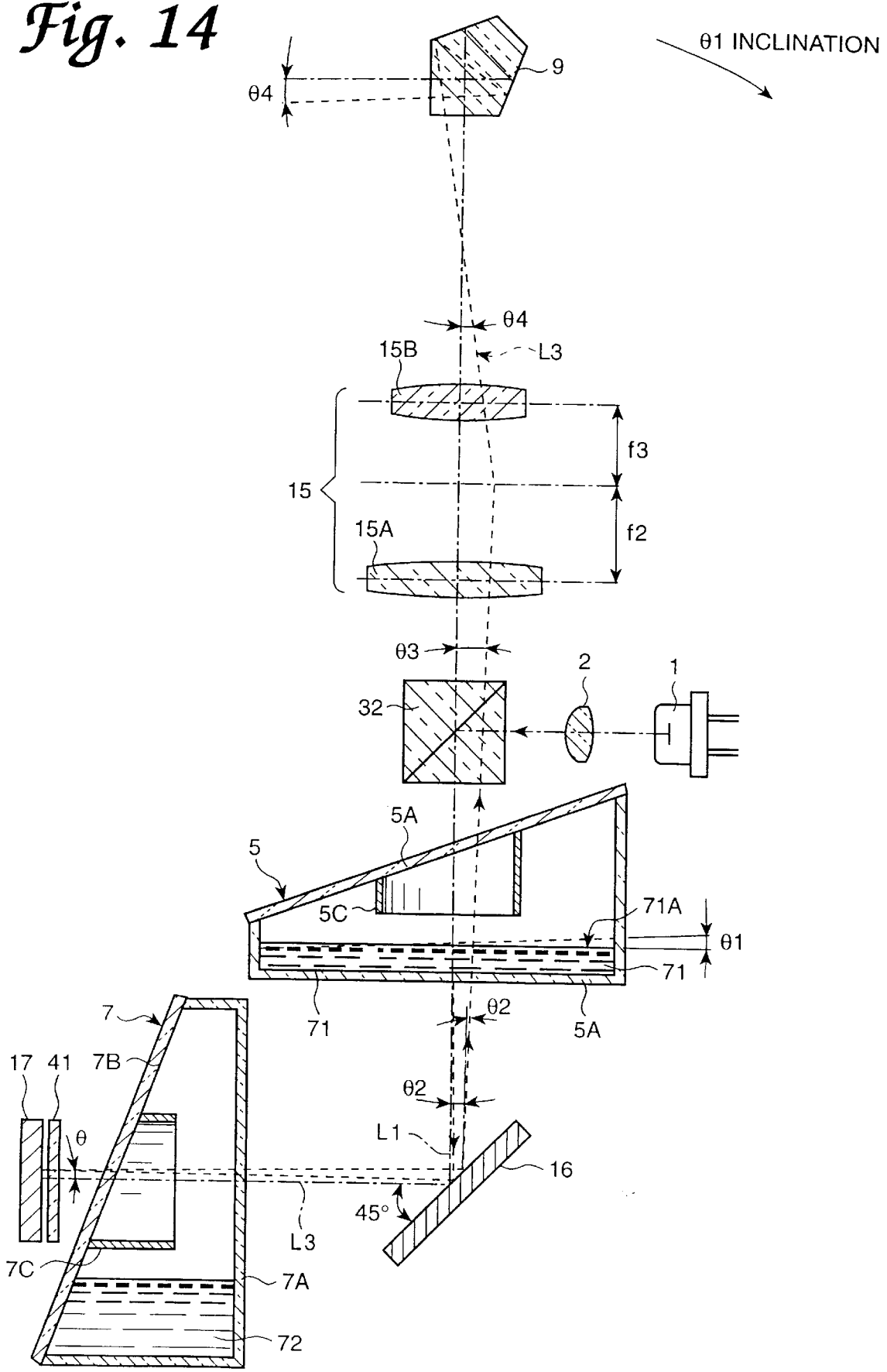

REFERENCE LIGHT GENERATOR

BACKGROUND OF THE INVENTION

1. Field of Invention

The present invention relates to a reference light generator that is used primarily to determine the degree of horizontality and the degree of verticality at a construction site and the like.

2. Description of Related Art

Japanese Patent Application Laid-Open No. 63-222214 discloses a conventional reference light generator. It will be explained with reference to FIGS. 15 (Prior Art) and 16 (Prior Art), the reference light generator according to the conventional art will be explained. FIG. 15 (Prior Art) is a cross-sectional view of the reference light generator. FIG. 16 (Prior Art) is similarly a cross-sectional view of the reference light generator, but in a state in which it is inclined at an angle $\theta 1$. The reference light generator is built in a main body 61. It includes a laser diode 1 serving as a light source, emits a visible light laser beam, a collimator lens 2, a sealed transparent container 63 in which silicon oils 71 and 72, or other suitable liquid are sealed. Silicon oils 71 and 72 having free liquid surfaces 71A and 72A, respectively, are sealed in the container 63, which is divided into two compartments. Light transmission parts 63A, 63B, and 63C of the container 63 are all parallel planes, and are installed so as to orthogonally intersect the optical axis of the laser beam. Light emitted from the laser diode 1 is transformed into a parallel light beam by the collimator lens 2, passes through the silicon oils 71 and 72 inside the sealed transparent container 63, and is guided downward through an aperture 61A at the bottom of the main body 61.

When the optical axis of the laser beam coincides with the direction of gravity, the free surfaces of the silicon oils 71 and 72 become parallel with respect to the light transmission parts 63A through 63C of the transparent container 63. In this case, the laser beam that is emitted from the laser diode 1 passes through the light transmission parts 63A through 63C of the transparent container 63. Then, the laser beam passes through parallel planes that are formed by the silicon oils 71 and 72, and finally is guided vertically downward along an optical path 1A without having its optical path bent.

A leveling device 62 is installed at the base of the reference light generator shown in FIG. 15 (Prior Art). Then, based on bubble pipe displays of leveling device 62, not shown in the drawing, the degree of horizontality is determined crudely so that the inclination of the reference light generator stays within a correctable angular range.

With reference to FIG. 16 (Prior Art), the operation of the reference light generator shown in FIG. 15 (Prior Art) when it is inclined by the angle $\theta 1$ will be explained. The free surfaces 71A and 72A of the silicon oils 71 and 72 maintain their level surfaces by the action of the gravitational force. Thus, as shown in FIG. 16 (Prior Art), the silicon oils 71 and 72 exhibit the shape of a wedge having an inclination angle $\theta 1$.

Then, the laser beam is bent by a deflection angle $\theta 2$ with respect to the optical path 1A along which the laser beam travels before passing through the transparent container 63. The prism effect of the wedge-shaped silicon oils 71 and 72 refracts the laser beam when it passes through the silicon oils 71 and 72. Then, the laser beam is bent by a deflection angle $\theta 2$ with respect to the optical path 1A along which the laser beam travels before passing through the transparent container 63. Finally, the laser beam is emitted along an optical path 1B out of the main body 61.

The refractive indices of the silicon oils 71 and 72 are denoted by n1 and n2. The relation between the inclination angle $\theta 1$ of the reference light generator and the deflection angle $\theta 2$ of the laser beam is expressed by $$\theta 2 = (n1 + n2 - 2) \cdot \theta 1.$$

This equation yields the identity $\theta 2 = \theta 1$, when n1=n2=1.500.

In this way, the inclination of the reference light generator can be corrected, and the laser beam can always be emitted vertically downward.

The laser beam that has been guided vertically downward is reflected in an orthogonal direction by a pentagonal prism not shown in the drawing, and is transmitted in a horizontal direction. In addition, this pentagonal prism is rotated at a prescribed rotational speed so as to have the optical path 1A coincide with the rotation axis of the pentagonal prism. In this way, a laser beam that scans along a horizontal plane can be obtained. Then, the degree of horizontality at a construction site can be easily determined by illuminating a wall surface and the like with this laser beam and by marking the laser beam.

Although not shown in the drawing, a mechanical-type reference light generator is also known. The mechanical-type reference light generator mechanically corrects the emission direction of the light source based on the inclination angle information of the reference light generator to be obtained from an inclination angle sensor, instead of correcting the inclination of the reference light generator using liquids as discussed in the above.

However, the only laser beam scan plane obtainable with the reference light generator shown in FIGS. 15 (Prior Art) and 16 (Prior Art), or the mechanical-type reference light generator is a horizontal plane. Hence, when determining the degree of horizontality and the degree of verticality, two apparatuses must be prepared, namely, one for determining the degree of horizontality and another for determining the degree of verticality. Moreover, in the manufacturing process of a mechanical-type reference light generator, the emission position of the reference light generator requires precise adjustment. This requirement sometimes becomes a factor that increases the manufacturing cost. Moreover, when an intense shock is applied to the mechanical-type reference light generator, the accuracy of the reference light generator is lost, and the emission position of the reference light generator has to be re-adjusted.

SUMMARY OF THE INVENTION

It is an object of the present invention to provide a reference light generator such that:

(1) the scan plane of the laser beam can be switched between the vertical and the horizontal by simply changing the installation position of the reference light generator, so that only one apparatus is required to determine the degree of horizontality and the degree of verticality;

(2) micro adjustment during the manufacturing process is not needed; and (3) the accuracy of the reference light generator is not affected by shock.

An embodiment of the present invention will be explained with reference to FIGS. 1 and 2.

A preferred embodiment of the invention includes a laser diode 1. A first sealed container 5 and a second sealed container 7 are installed orthogonal to each other on a vertical plane, containing silicon oils 71 and 72, respectively, each oil having a free liquid surface. A mirror 6, serving as a first reflection means is installed next to the first container 5, for reflecting a light that has passed through the first container 5 so that the light enters the first container 5 again. A mirror 8, serving as a second reflection means is installed next to the second container 7, for reflecting a light that passes through the second container 7 so that the light enters the second container 7 again.

A half mirror 3, serving as an optical path guiding means is provided for: a) splitting the light that is emitted from the laser diode 1 into a first light L1 that travels toward the first container 5 and a second light L2 that travels toward the second container 7; and (b) guiding the first light L1, which passes through the first container 5, is reflected by the first mirror 6, and passes through the first container 5 again and the second light L2 that passes through the second container 7, is reflected by the mirror 8, and passes through the second container 7 again, so as to have them ultimately transmitted in the same exit direction. A movable light shielding plate 4, serving as an optical path selecting means selectively shields one of the first light L1 and the second light L2 which have been obtained by having the half mirror 3 split the laser beam.

The reference light generator as a whole can be installed in a first position shown in FIG. 1, and in a second position shown in FIG. 2 that is achieved by rotating from the first position the generator by 90 degrees around a horizontal axis that passes through the half mirror 3 and is perpendicular to the page. In the first position, the first light L1 passes through only the silicon oil 71 that is sealed in the first container 5. In the second position, the second light L2 passes through only the silicon oil 72 that is sealed in the second container 7. In this way, the above-stated object is achieved.

According to another embodiment of the invention, the movable light shielding plate 4 is activated by the gravity, and blocks the optical path that leads to one of the first container 5 and the second container 7.

An embodiment of the invention shown in FIG. 7 includes a Kepler-type telescope 15 constituting an angle changing means for changing the propagation direction angle of the light that is guided by the half mirror 3.

An embodiment of the present invention shown in FIGS. 5 and 6 has a pentagonal prism 9 forming part of a light projection optical system. The light projection optical system projects a light that has been guided by the half mirror 3, in all directions along one of a first reference plane that corresponds to the first position and a second reference plane that corresponds to the second position.

Another embodiment of the invention includes a laser diode 1. A first container 5 and a second container 7 are installed orthogonal to each other on the vertical plane, in which silicon oils 71 and 72 having free liquid surfaces 71A and 72A are sealed, respectively. Mirror 6 is installed next to the first container 5, for reflecting a light that has passed through the first container 5 so that the light passes through the first container 5 again. Mirror 8 is installed next to the second container 7, for reflecting a light that passes through the second container 7 so that the light passes through the second container 7 again. A first wavelength plate 5P rotates by a prescribed angle the polarization plane of the light that passes through the first container 5. A second wavelength plate 7P rotates by a prescribed angle the polarization plane of the light that passes through the second container 7. A movable ½ wavelength plate 42 is removable from and installable on the optical path L of the light that is emitted from the laser diode 1, and rotates the polarization plane of the transmitting light by a prescribed angle when it is installed on the optical path L. A polarized half mirror 33 guides (a) light from the laser diode 1 to the first container 5 when the movable ½ wavelength plate 42 is installed on the optical path L, (b) light from the laser diode 1 to the second container 7 when the movable ½ wavelength plate 42 is withdrawn from the optical path L. The first light, which passes through the first container 5 and the first wavelength plate 5P, is reflected by the first mirror 6, and passes through the first container 5 and the first wavelength plate 5P again, and the second light, which passes through the second container 7 and the second wavelength plate 7P, is reflected by the mirror 8, and passes through the second container 7 and the second wavelength plate 7P again, so as to have them transmitted in the same direction.

The reference light generator as a whole can be installed in the first position shown in FIG. 5 and the second position shown in FIG. 6. The second position is obtained by rotating the structure by 90 degrees around a horizontal axis that is perpendicular to the page space from the first position.

In the first position, the movable ½ wavelength plate 42 is installed on the optical path L. Then, the light that is emitted from the laser diode 1 passes through only the silicon oil 71 that is sealed in the first container 5.

In the second position, the movable ½ wavelength plate 42 is removed from the optical path L. Then, light emitted from the laser diode 1 passes through only the silicon oil 72 that is sealed in the second container 7. In this way, the above-stated object is achieved.

According to one embodiment of the invention, the movable ½ wavelength plate 42 is activated by the gravitational force, and is installed on and removed from the optical path L.

According to another aspect of the invention, the phase difference of the first and second wavelength plates 5P and 7P, respectively, is set to ¼ wavelength. The phase difference of the movable ½ wavelength plate 42 is set to ½ wavelength; and the polarized half mirror 33 is replaced by a polarization beam-splitter (PBS) 32.

The reference light generator can also be equipped with a projection optical system including a conic mirror 10. Mirror 10 projects light that is guided by the polarized half mirror 33 to one of the first and second reference planes, where the first reference plane corresponds to the first position shown in FIG. 5 and the second reference plane corresponds to the second position shown in FIG. 6.

Another embodiment of the invention is shown in FIGS. 11 and 12. This embodiment also includes a laser diode 1. Sealed first container 5 and a second container 7 are installed orthogonal to each other on the vertical plane and contain silicon oils 71 and 72 having free liquid surfaces. Mirrors 16 and 17, constituting a reflecting means, guide light that is emitted from the laser diode 1 and passes through the first container 5 so that the light passes through the second container 7 and the first container 5 again. The reference light generator as a whole is installable in the first position shown in FIG. 11 and the second position shown in FIG. 12, which is obtained by rotating the structure by 90 degrees around a horizontal axis that is perpendicular to the page plane from the first position as shown in FIG. 12.

In the first position shown in FIG. 11, the light that is emitted from the laser diode 1 reciprocates through only the silicon oil 71 that is sealed in the first container 5. In the second position shown in FIG. 12, light that is emitted from the laser diode 1 reciprocates through only the silicon oil 72 that is sealed in the second container 7. In this way, the above-stated object is achieved.

According to another aspect of the invention, mirrors are provided to reflect light that is emitted from the laser diode 1. The light is guided so as to transmit the light through the first and second containers 5 and 7, respectively. The reflecting means is further equipped with an half mirror 31. A half mirror 31, constituting an optical path switching means, transmits the light that re-passes through the first container 5 and is emitted from the first container 5.

A fourth embodiment of the invention is shown in FIG. 14. The half mirror 31 is constituted by a polarization beam-splitter 32 and a wavelength plate 41.

An embodiment of the present invention will be explained with reference to FIG. 11. In this embodiment, the invention is further equipped with telescope 15 for changing the propagation direction angle of the light that passes through the half mirror 31.

The invention can be further equipped with a pentagonal prism 9. Pentagonal prism 9 operates as follows. In the first position, the light projection optical system projects the light that has reciprocated through the first and second containers in all directions along a first reference plane. In the second position, the light projection optical system projects the light that has reciprocated through the first and second containers in all directions along a second reference plane.

According to another embodiment of the invention the refractive indices of the silicon oils 71 and 72 that are sealed in the first container 5 and the second container 7, respectively, are set to 1.5.

Drawings for showing the embodiments of the present invention have been used in the above explanation in order to explain the present invention with clarity. However, it should be noted that applications of the present invention are not restricted to those embodiments.

BRIEF DESCRIPTION OF THE DRAWINGS

FIG. 14 is a vertical cross-sectional view of the key components of another alternative example of the reference light generator according to the fourth embodiment of the present invention showing the case in which the reference light generator is used to determine the degree of horizontality.

DETAILED DESCRIPTION OF PREFERRED EMBODIMENTS

First Embodiment

Figure 1:
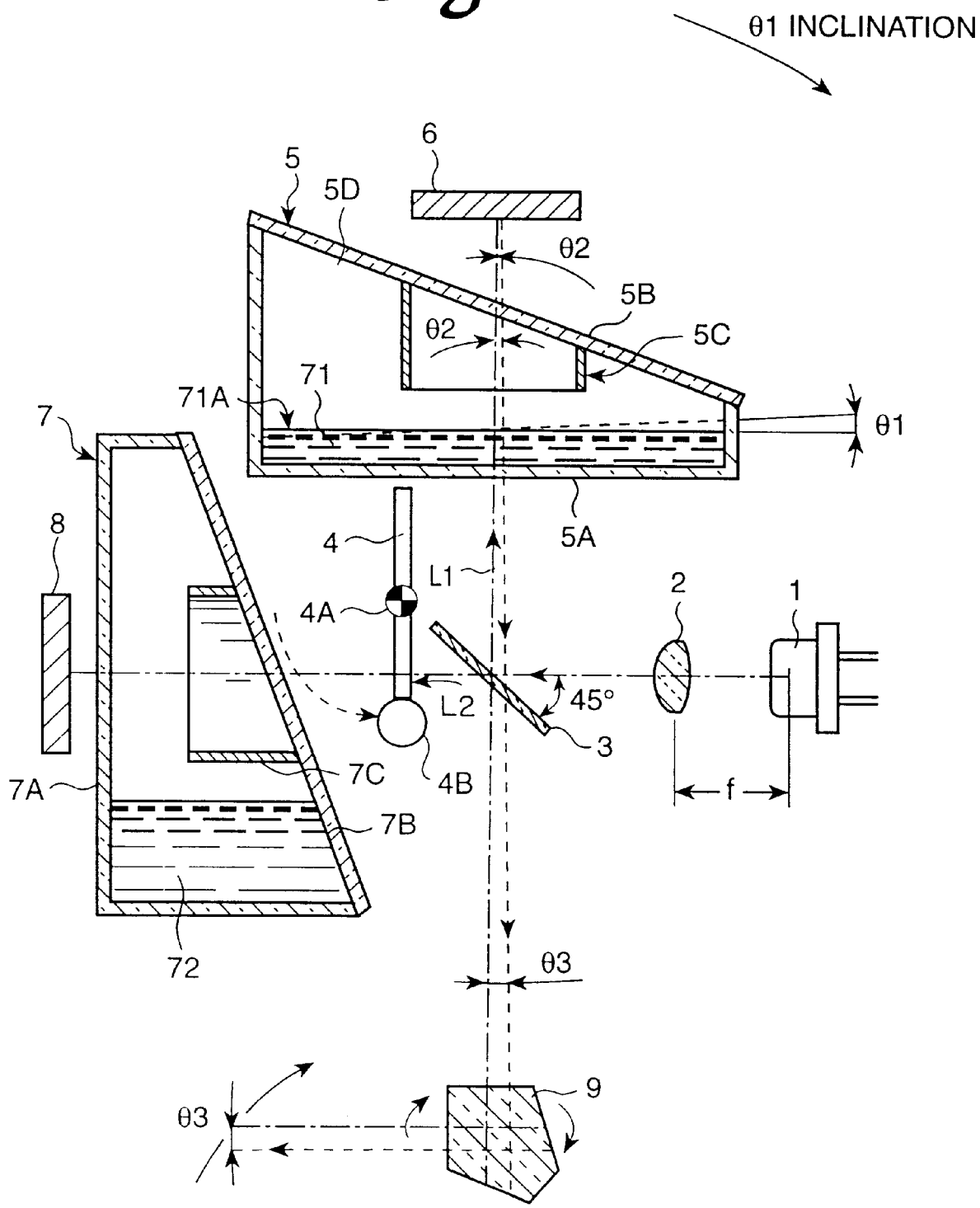
FIG. 1 is a vertical cross-sectional view of the key components of the reference light generator according to the first embodiment of the present invention showing the case in which the reference light generator is used to determine the degree of horizontality.
Figure 2:
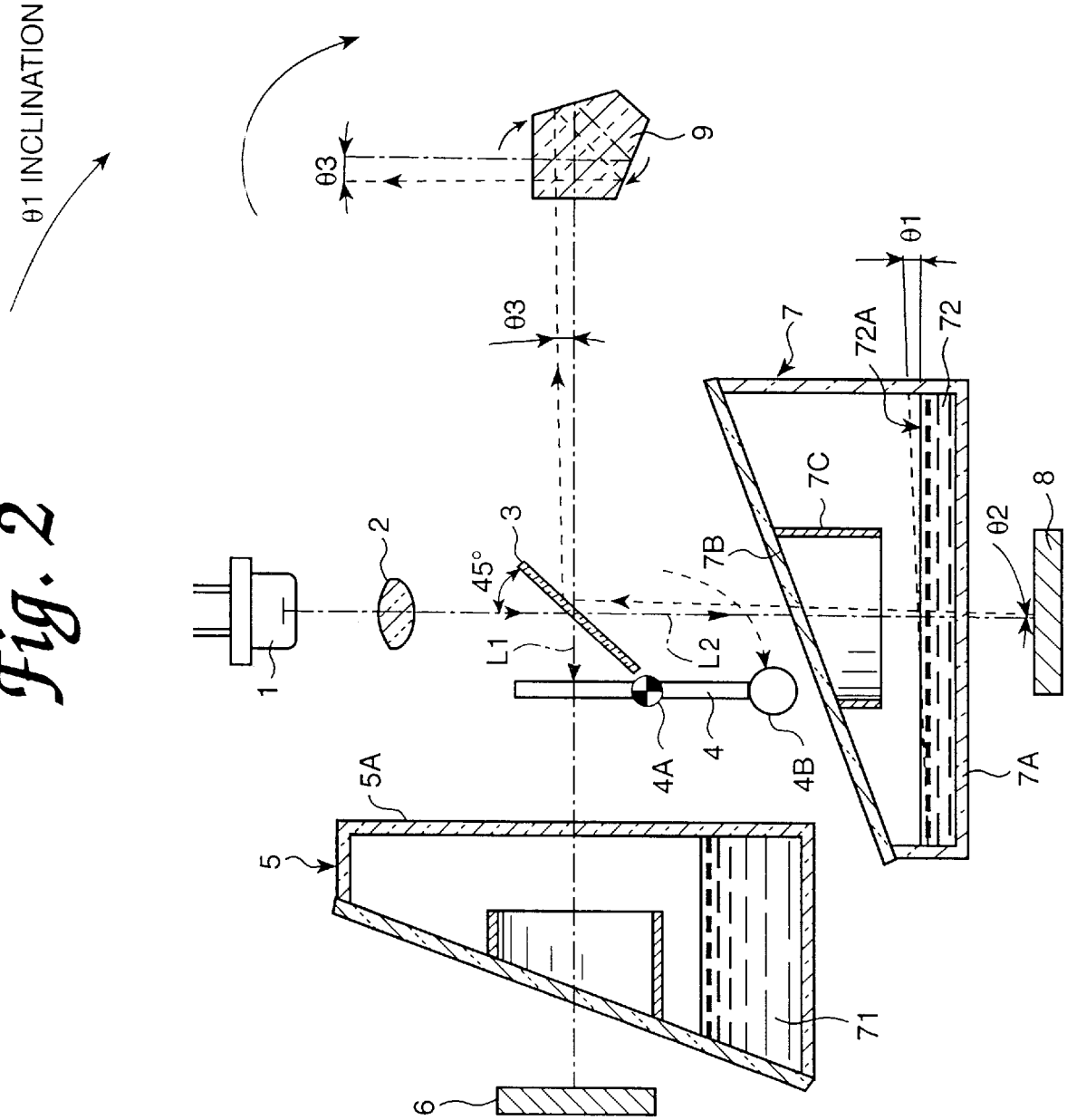
FIG. 2 is a vertical cross-sectional view of the key components of the reference light generator according to the first embodiment of the present invention showing the case in which the reference light generator is used to determine the degree of verticality.
Figure 15:
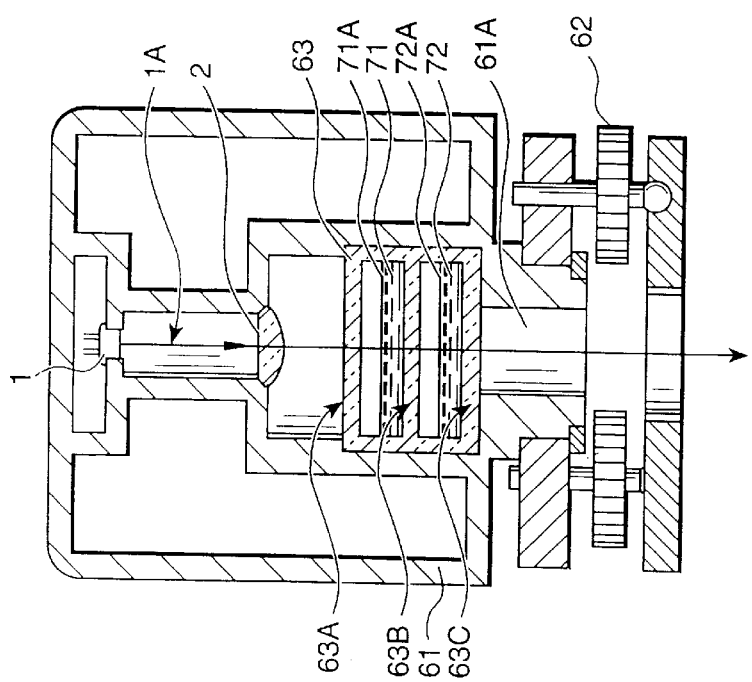
FIG. 15 (Prior Art) is a vertical cross-sectional view of a laser projection surveying equipment having a reference light generator according to the prior art.

A first embodiment of the present invention will be explained with reference to FIGS. 1 and 2. FIGS. 1 and 2 are vertical cross-sectional views showing the structure of key components of a reference light generator. FIG. 1 shows the structure of the key components of the reference light generator when it is used to determine the degree of horizontality. FIG. 2 shows the structure of the key components of the reference light generator when it is used to determine the degree of verticality. The reference light generator shown in FIG. 2 is installed by rotating the reference light generator shown in FIG. 1 in the counterclockwise direction by 90° around a horizontal axis that is perpendicular to the plane of the page. In FIGS. 1 and 2, the same reference codes are used for the parts that correspond to the same components shown in FIGS. 15 (Prior Art) and 16 (Prior Art) that show a reference light generator according to the conventional art. Thus, they will not be explained.

Silicon oils 71 and 72 are sealed inside transparent containers 5 and 7. The containers 5 and 7 have trapezoidal cross sections. Light transmission planes 5A, 5B, 7A, and 7B that constitute these transparent containers 5 and 7 are made of transparent parallel planar plates. These transparent containers 5 and 7 are installed orthogonally to each other so that the light transmission plane 5A becomes horizontal, and the light transmission plane 7A becomes vertical. A mirror 6, serving as a first reflection means, is installed above the transparent container 5 so that the mirror becomes parallel to the light transmission plane 5A. A mirror 8, serving as a second reflection means, is installed to the left of the transparent container 7 so that the mirror becomes parallel to the light transmission plane 7A. In addition, a laser diode 1 emits a laser beam. On the extension of the optical path of the laser beam, a half mirror 3 that is inclined by 45° with respect to this optical path is installed. A movable light shielding plate 4 is installed behind this half mirror 3 (to the left of the mirror 3 in FIG. 1).

The movable light shielding plate 4 will be explained in the following. A weight bob 4B is attached to one end of the movable light shielding plate 4. The weight bob 4B is installed so that it is rotatable around a rotation axis 4A that extends in a direction perpendicular to the plane of the page plane of FIG. 1. The weight bob 4B rotates by the gravitational force in response to the installation position of the reference light generator shown in FIG. 1 or FIG. 2, and shields one of the optical paths L1 and L2 of the laser beam selectively.

Next, the operation of the reference light generator according to the first embodiment will be explained in the case in which it is used to determine the degree of horizontality. In FIG. 1, the laser diode 1 emits a laser beam. The half mirror 3 reflects upward a portion of the laser beam that a collimator lens 2 has transformed into a parallel light beam. The reflected portion of the laser beam propagates along the optical path of light L1. The remaining portion of light from the laser beam passes through the half mirror 3, and propagates straight along the optical path L2. The movable light shielding plate 4 blocks the optical path of the light that passes through the half mirror 3 and propagates straight along the optical path L2. In this way, the movable light shielding plate 4 prevents an unwanted laser beam from straying in determining the degree of horizontality.

The portion of the laser beam that is reflected upward by the half mirror 3 advances straight along the optical path of light L1, passes through the light transmission plane 5A, the silicon oil 71, and the light transmission plane 5B, and is reflected by the mirror 6. The laser beam that has been reflected by the mirror 6 passes through the light transmission plane 5B, the silicon oil 71, and the light transmission plane 5A again, and returns to the half mirror 3.

The half mirror 3 reflects a portion of this laser beam, toward the laser diode 1. The remaining portion of light from this laser beam passes through the half mirror 3, propagates straight downward, has its optical path bent by 90 degrees by a pentagonal prism 9, and exits in a horizontal direction. The pentagonal prism 9 rotates at a prescribed angular speed so as to coincide the optical path of light L1 with the axis of rotation of pentagonal prism 9 in the same way as the one that has been explained in the paragraph in which reference light generators according to the conventional art is explained. In this way, a horizontal laser scan plane can be obtained.

Still with reference to FIG. 1, it will now be explained how the inclination of the reference light generator is automatically corrected when the reference light generator inclines by an angle $\theta 1$. When the reference light generator inclines by the angle $\theta 1$ in the clockwise direction around a rotation axis in a direction perpendicular to the page plane of FIG. 1, the free liquid surface 71A of the silicon oil 71 that is sealed in the transparent container 5 maintains its level surface by the action of the gravity. In this way, the silicon oil 71 acts as a liquid prism having a vertical angle $\theta 1$. It should be noted that, for convenience in FIG. 1, the state in which the free liquid surface 71A, but not the apparatus, is inclined by the angle $\theta 1$, is shown with a broken line.

The laser beam that propagates straight along the optical path of light L1 and enters the light transmission plane 5A of the transparent container 5 passes through the silicon oil 71. When this laser beam passes through the silicon oil 71, the prism effect of this silicon oil 71 bends the laser beam by a deflection angle $\theta 2$ in the clockwise direction with respect to the optical path of light L1 of the laser beam. If the refractive index of the silicon oil 71 is given by n, the relation between the inclination angle $\theta 1$ of this reference light generator and the deflection angle $\theta 2$ can be expressed by the following equation.

$$\theta 2 = (n-1) \cdot \theta 1 \qquad \text{Equation (1)}$$

The laser beam, which has been bent by the deflection angle $\theta 2$, passes through the light transmission plane 5B. The light transmission plane 5B will be explained here. This light transmission plane 5B is, as mentioned before, a parallel planar plate. The deflection angle $\theta 2$ of the laser beam remains unchanged when the laser beam passes through this light transmission plane 5B. Moreover, the light transmission plane 5B is inclined so as to face the light transmission plane 5A at a prescribed angle. Due to this structure, the laser beam that is reflected by the surface of the light transmission plane 5B is guided out of its optical path. In this way, the structure of the reference light generator prevents an unwanted light beam from exiting out of the reference light generator.

Further, a dike cylinder 5C is installed on the light transmission plane 5B. The dike cylinder 5C prevents the silicon oil 71 from adhering to the light transmission plane 5B and thereby blocking the optical path of the laser beam when the reference light generator is inclined by a large angle. In addition, even if the silicon oil 71 accidentally adheres to a part through which the laser beam passes, the silicon oil 71 that adheres to the light transmission plane 5B drops off by its own weight since the light transmission plane 5B is an inclined plane, as has been explained in the above. Thus, the silicon oil 71 does not block the optical path of the laser beam.

The laser beam that passes through light transmission plane 5B enters the mirror 6 at an incidence angle $\theta 2$, and is reflected at the reflection angle $\theta 2$. Then, the laser beam passes through the light transmission plane 5B again, and is refracted by the silicon oil 71. When the laser passes through the silicon oil 71, the laser beam is given a deflection angle $\theta 3$ in the counterclockwise direction with respect to the optical path of light L1. The relation between the deflection angle θ3 and the inclination angle θ1 of the silicon oil 71 can be expressed as follows.

$$\theta 3 = \theta 2 + (n-1).\theta 1 = 2(n-1).\theta 1 \quad \text{Equation (2)}$$

It follows from equation (2) that θ3=θ1 when the refractive index n is set to 1.5. Thus, by setting the refractive index of the silicon oil 71 to 1.5 in the present reference light generator, the laser beam can be set to be guided always vertically downward regardless of the inclination of the reference light generator.

The laser beam that is guided vertically downward passes through the half mirror 3, and enters the pentagonal prism 9. This pentagonal prism 9 bends the optical path of the laser beam by 90 degrees. Then the laser beam exits in a horizontal direction. This pentagonal prism 9 is rotatable around the optical path of light L1 at a prescribed rotational speed in the same way as in the set-up of the reference light generator according to the conventional art. In this way, a horizontal scan plane of the laser beam can be obtained.

Next, with reference to FIG. 2, the case in which the reference light generator according to the first embodiment is used to examine a degree of verticality will be explained. In the installation configuration shown in FIG. 2, by the gravitational force, the silicon oils 71 and 72 that are sealed in the transparent containers 5 and 7, respectively, are moved toward the bottoms of the containers 5 and 7, respectively. Moreover, the movable light shielding plate 4 is rotated in the clockwise direction by 90 degrees around axis 4A.

In addition, as shown in FIG. 2, when the reference light generator according to the present embodiment is used to examine a degree of verticality, the silicon oil 72 that is sealed in the transparent container 7 corrects the inclination. A laser beam is emitted from the laser diode 1, passes through the collimator lens 2, and becomes a parallel light beam. Then, a portion of the laser beam is reflected by the half mirror 3, and propagates along the optical path of light L1. However, the movable light shielding plate 4 blocks the optical path of the laser beam, thereby preventing an unwanted laser beam from straying when the degree of verticality is determined.

The remainder of the laser beam that becomes a parallel light beam in the above-explained structure passes through the half mirror 3, and advances straight along the optical path L2. Then, when the reference light generator inclines by the angle θ1, the laser beam passes through the light transmission plane 7B of the transparent container 7, the silicon oil 72, and the light transmission plane 7A. Then, the laser beam: enters the mirror 8 at an incidence angle 74 2; is reflected at the reflection angle θ2, passes through the light transmission plane 7A again; and is given a deflection angle θ3 with respect to the optical path of light L1 when the laser beam passes through the silicon oil 72 in the same way as was explained with reference to FIG. 1.

In this embodiment shown in FIG. 2 also, the above-mentioned equations (1) and (2) hold. Thus, the deflection angle θ3 and the inclination angle θ1 of the reference light generator become equal when the refractive index n of the silicon oil 72 is set to 1.5. Then, the laser beam passes through the light transmission plane 7B again, and the half mirror 3 guides the laser beam in a horizontal direction. Finally, the pentagonal prism 9 that is rotatable at a prescribed rotational speed transforms the laser beam into a laser beam that scans along a vertical plane.

Second Embodiment

Figure 3:
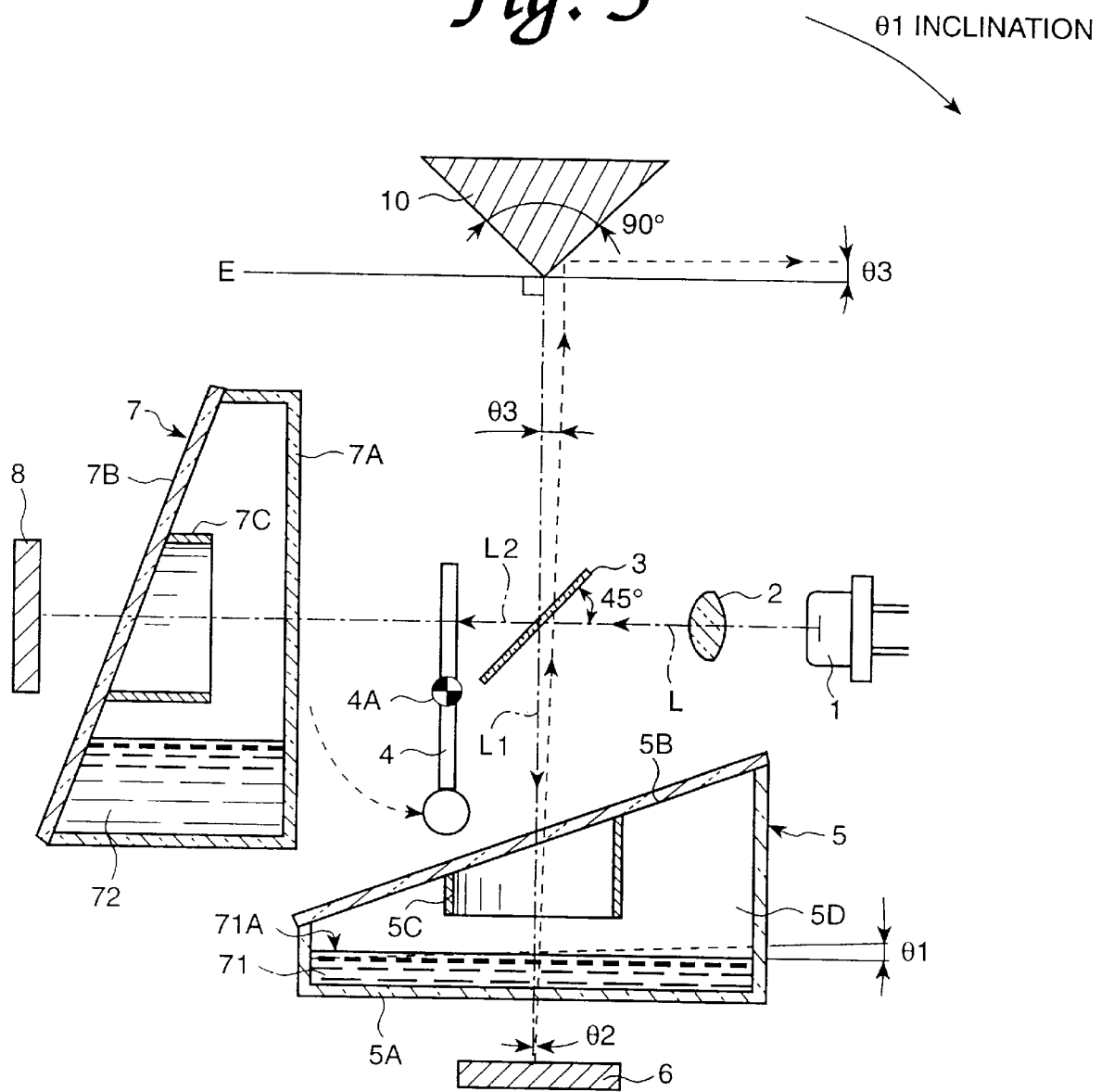
FIG. 3 is a vertical cross-sectional view of the key components of the reference light generator according to the second embodiment of the present invention showing the case in which the reference light generator is used to determine the degree of horizontality.
Figure 4:
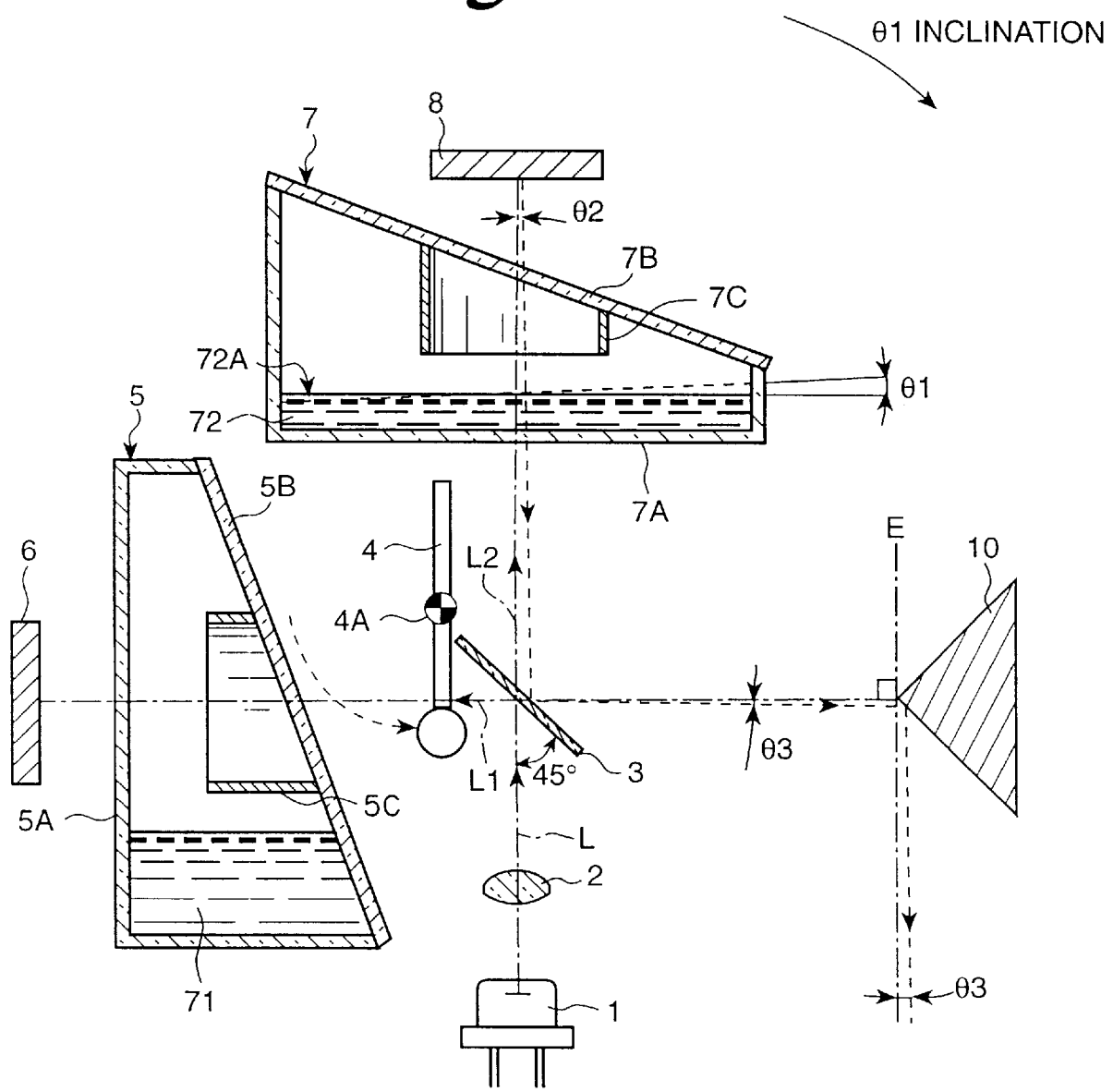
FIG. 4 is a vertical cross-sectional view of the key components of the reference light generator according to the second embodiment of the present invention showing the case in which the reference light generator is used to determine the degree of verticality.

A second embodiment of the present invention will be explained with reference to FIGS. 3 and 4. FIGS. 3 and 4 are vertical cross-sectional views showing the key components of the reference light generator according to the second embodiment of the present invention. FIG. 3 shows the case in which the reference light generator is used to determine the degree of horizontality. FIG. 4 shows the case in which the reference light generator is used for determining the degree of verticality. The reference light generator shown in FIG. 4 is installed by rotating the reference light generator shown in FIG. 3 by 90 degrees in the clockwise direction around a horizontal axis perpendicular to the page plane. It should be noted that, in FIGS. 3 and 4, the same reference codes are used for the same components that are used in FIGS. 1 and 2. Thus, such reference codes will not be explained. As shown in FIGS. 1 and 2, in FIGS. 3 and 4 as well, the liquid surface 71A or 72A of the silicon oil when the reference light generator is installed at the inclination angle θ1, is shown by a broken line.

With reference to FIG. 3, an example in which the reference light generator that is installed with the inclination angle θ1 is used for examining a degree of horizontality will be explained.

The laser diode 1 emits a laser beam. The laser beam passes through the collimator lens 2, is transformed into a parallel light, and advances to the left on the drawing. A portion of the laser beam passes through the half mirror 3, advances along the optical path L2. Then, the movable light shielding plate 4 blocks this portion of the laser beam. On the other hand, the remainder of the laser beam that enters the half mirror 3 is reflected downward by the half mirror 3, passes through the light transmission plane 5B, the silicon oil 71, and the light transmission plane 5A, and enters the mirror 6 at an incidence angle θ2. Then, the remaining laser beam is reflected by the mirror 6 at the reflection angle θ2, passes through the light transmission plane 5A, the silicon oil 71, the light transmission plane 5B, and the half mirror 3. Then, the laser beam propagates upward in FIG. 3, and is given a deflection angle θ3 with respect to the optical path of light L1. In this case, the relation between the inclination angle θ1 of the reference light generator and the deflection angle θ3 can be expressed by the afore-mentioned equations (1) and (2). Thus, when the refractive index n of the silicon oil 71 is 1.5, θ3 =θ1 holds, that is, the remainder laser beam is given the deflection angle θ3=θ1 with respect to the optical path of light L1. However, as FIG. 3 shows, the inclination direction of the laser beam to which the deflection angle θ3 is given coincides with the inclination direction of the reference light generator. Hence, the inclination direction of the laser beam is not corrected. In other words, when this laser beam exits the reference light generator, the laser beam is inclined by the sum of the inclination angle θ1 of the reference light generator and the deflection angle θ3, with respect to the vertical direction.

Still with reference to FIG. 3, it will be explained how the laser beam to which the deflection angle θ3 is given with respect to the optical path of light L1 exits in a horizontal direction. This laser beam enters a conic mirror 10 having a vertex angle of 90 degrees that is installed on the upper portion of the reference light generator, and is reflected by the conic mirror 10. The angle formed by the optical path of the laser beam that is reflected by the conic mirror 10 and the line segment E that passes through the vertex of the conic mirror 10 and intersects the optical path of light L1 orthogonally is θ3. In this case, the line segment E is inclined in the clockwise direction by the angle θ1 with respect to a horizontal plane. Thus, this inclination angle θ1 and the angle θ3 (=θ1) cancel each other. In this way, the inclination of the laser beam is corrected, and the laser beam is guided in a horizontal direction.

It should be noted that the laser beam has a prescribed beam diameter. Since the laser beam enters the conic surface of the conic mirror 10 including the vertex, the reflected laser beam becomes a radial light. In this way, a degree of horizontality can be examined by casting the horizontal laser beam onto a wall surface or the like.

With reference to FIG. 4, an example in which the reference light generator according to the present embodiment is used for determining the degree of verticality will be explained. In the reference light generator shown in FIG. 4, by the gravity, the silicon oils 71 and 72 that are sealed in the transparent containers 5 and 7, respectively, are moved toward the bottoms of the containers 5 and 7, respectively. Moreover, the movable light shielding plate 4 is rotated in the counterclockwise direction by 90 degrees around the axis 4A.

A laser beam is emitted from the laser diode 1, passes through the collimator lens 2, and becomes a parallel light. Then, a portion of the laser light is reflected by the half mirror 3, and propagates along the optical path of light L1. However, the movable light shielding plate 4 blocks the optical path of the laser, thereby preventing an unwanted laser beam from straying in determining the degree of verticality.

The remainder laser beam, which passes through the half mirror 3 and advances upward in the drawing, passes through the light transmission plane 7A, the silicon oil 72, and the light transmission plane 7B, and is given a deflection angle θ2 with respect to the optical path L2. Then, the laser beam enters the mirror 8 at an incidence angle θ2, is reflected at the reflection angle θ2, passes through the light transmission plane 7B, the silicon oil 72, and the light transmission plane 7A again, and is given a deflection angle θ3 with respect to the optical path L2.

The half mirror 3 reflects this laser beam to the right on the drawing. Then, just as has been explained with reference to FIG. 3, the conic mirror 10 corrects the inclination of the laser beam, transforms the laser beam into a radial light, and casts the radial light onto a wall surface and the like. In this way, the degree of verticality can be determined.

In the above-discussed second embodiment, of the laser beam split by the half mirror 3, the unwanted portion of the laser beam is blocked by the movable light shielding plate 4, and only the necessary portion of the laser beam is emitted from the reference light generator. However, in place of the half mirror 3 and the movable light shielding plate 4, a polarization beam-splitter, a movable ½ wavelength plate, and a ¼ wavelength plate may be used. This example will be explained with reference to FIGS. 5 and 6.

Figure 5:
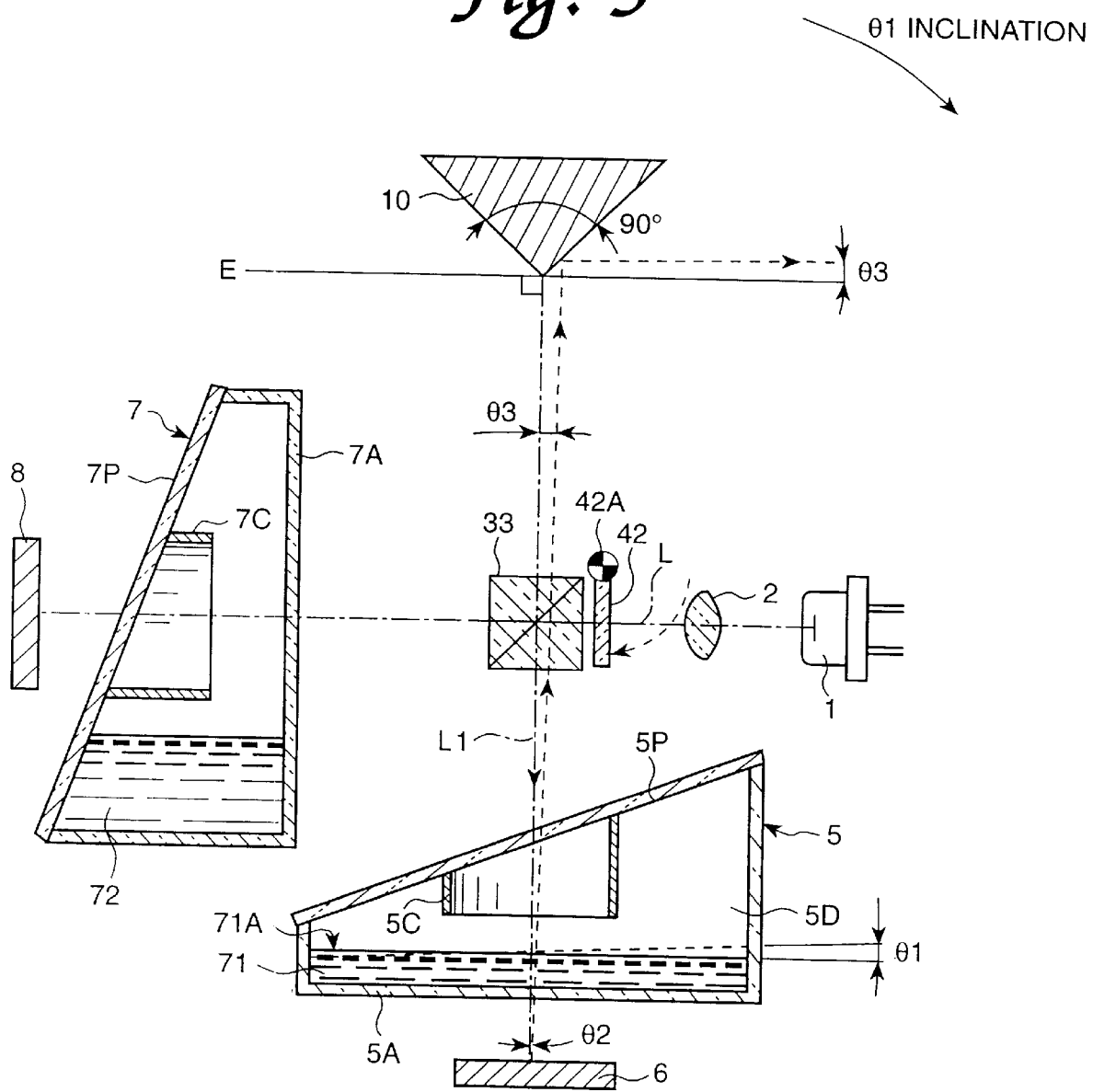
FIG. 5 is a vertical cross-sectional view of the key components of an alternative example of the reference light generator according to the second embodiment of the present invention showing the case in which the reference light generator is used to determine the degree of horizontality.
Figure 6:
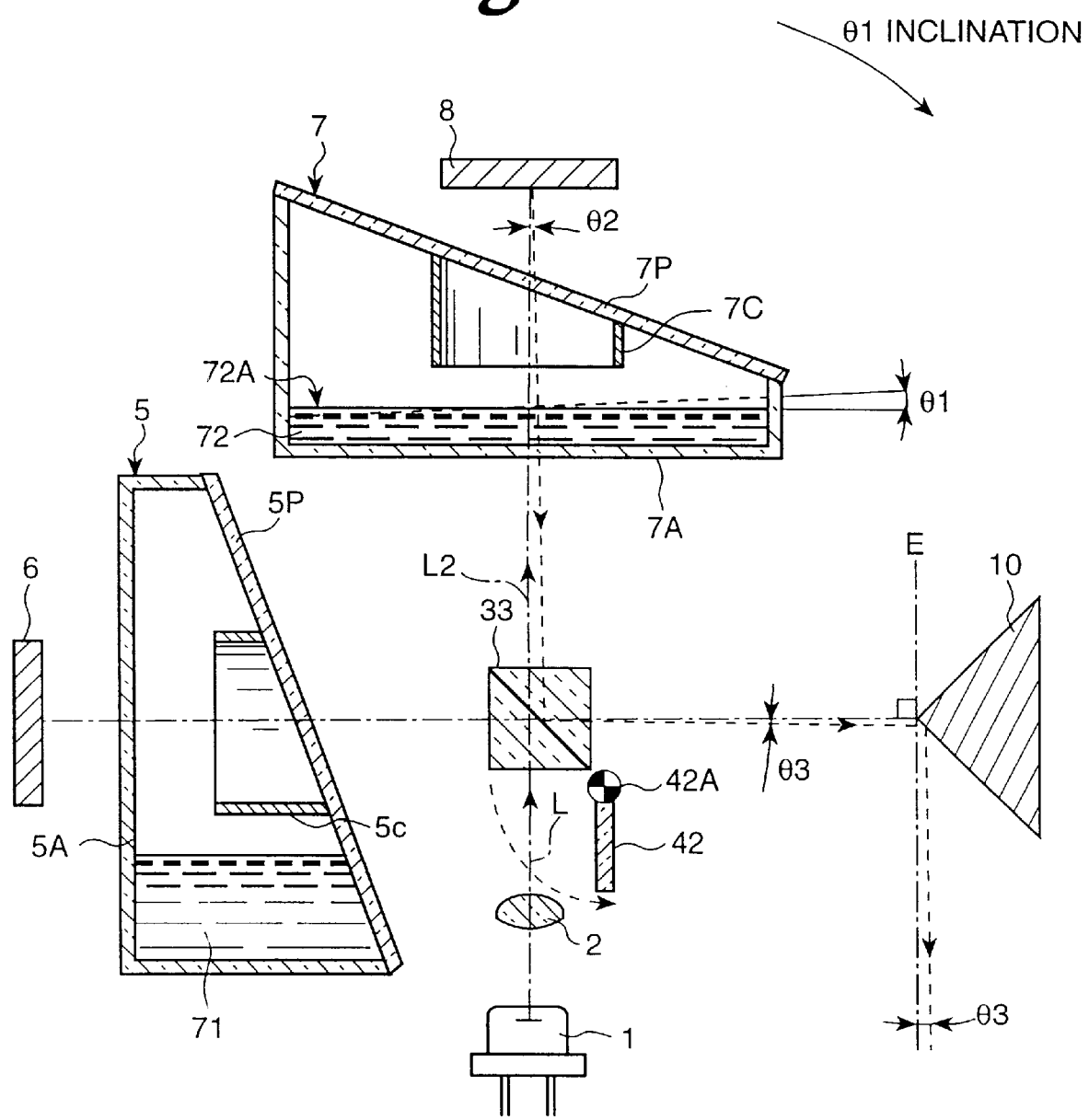
FIG. 6 is a vertical cross-sectional view of the key components of an alternative example of the reference light generator according to the second embodiment of the present invention showing the case in which the reference light generator is used to determine the degree of verticality.

FIG. 5 illustrates the case in which the reference light generator is used to determine the degree of horizontality. FIG. 6 illustrates the case in which the reference light generator is used to determine a degree of verticality. The reference light generator shown in FIG. 6 is installed by rotating the reference light generator shown in FIG. 5 by 90 degrees in the clockwise direction around a horizontal axis perpendicular to the page plane. The differences between the reference light generator shown in FIG. 3 and 4, and the one shown in FIGS. 5 and 6 are the following.

The half mirror 3 shown in FIGS. 3 and 4 is replaced by a polarization beam-splitter (PBS) 32. The movable light shielding plate 4 is replaced by a movable half wavelength plate 42. The light transmission plane 5B is replaced by a ¼ wavelength plate 5P. The light transmission plane 7B is replaced by a ¼ wavelength plate 7P. These differences will be explained next.

In FIG. 5, the movable ½ wavelength plate 42 is supported by a rotation axis 42A so as to be freely rotatable around the rotation axis 42A. This movable half wavelength plate 42 is positioned so as to intersect the optical path L of the laser beam by the gravity when the reference light generator is used to determine the degree of horizontality as shown in FIG. 5. Then, the laser beam that advances along the optical path L has its polarization plane rotated by 90 degrees when passing through the movable ½ wavelength plate. A linearly polarized laser beam is emitted from the laser diode 1, and advanced along the optical path L. The polarization plane of the laser diode 1 is adjusted so that the PBS 32 will reflect the linearly polarized laser beam downward on the drawing after the laser beam transmits the movable half wavelength plate 42.

The laser beam that has been reflected downward on the drawing by the PBS 32 and advances along the optical path of light L1 reciprocates through the ¼ wavelength plate 5P, the silicon oil 71, and the light transmission plane 5A. During this process, the laser beam is bent by a deflection angle θ3, and has its polarization plane rotated by 90 degrees. In this way, the laser beam is bent by the deflection angle θ3, and advances along a straight path inside the PBS 32. Then, the conic mirror 10 that is installed above the PBS 32 corrects the inclination of the laser beam, transforms the laser beam into a radial light, and emits the radial light in a horizontal direction.

When this reference light generator is used for determining the degree of verticality as shown in FIG. 6, by the action of the gravity, the movable half light wavelength plate 42 rotates around the rotation axis 42A in the counterclockwise direction, and withdraws from the optical path L of the laser beam. Hence, since the laser beam enters the PBS 32 without having its polarization plane rotated, the laser beam passes through the PBS 32 and advances straight. Then, the laser beam passes through the light transmission plane 7A, the silicon oil 72, and the ¼ wavelength plate 7P, is reflected by the mirror 8, and passes through the ¼ wavelength plate 7P, the silicon oil 72, and the light transmission plane 7A again. During this process, just as has been explained with reference to FIG. 4, the laser beam is bent by a deflection angle θ3 with respect to the optical path L2. Further, during this process, the polarization plane of the laser beam is rotated by 90 degrees. Then, the PBS reflects the laser beam to the right on the drawing, and the conic mirror 10 corrects the inclination of the laser beam, transforms the laser beam into a radial light, and emits the radial light in a vertical direction.

By adopting the structure shown in FIGS. 5 and 6 for the reference light generator according to the second embodiment, when the laser beam is reflected by the half mirror 3 in the reference light generator shown in FIGS. 3 and 4, or when the laser beam passes through the half mirror 3, the light amount loss can be reduced. Thus, the laser beam that is emitted from the laser diode 1 can be efficiently guided out of the reference light generator.

Third Embodiment

Figure 7:
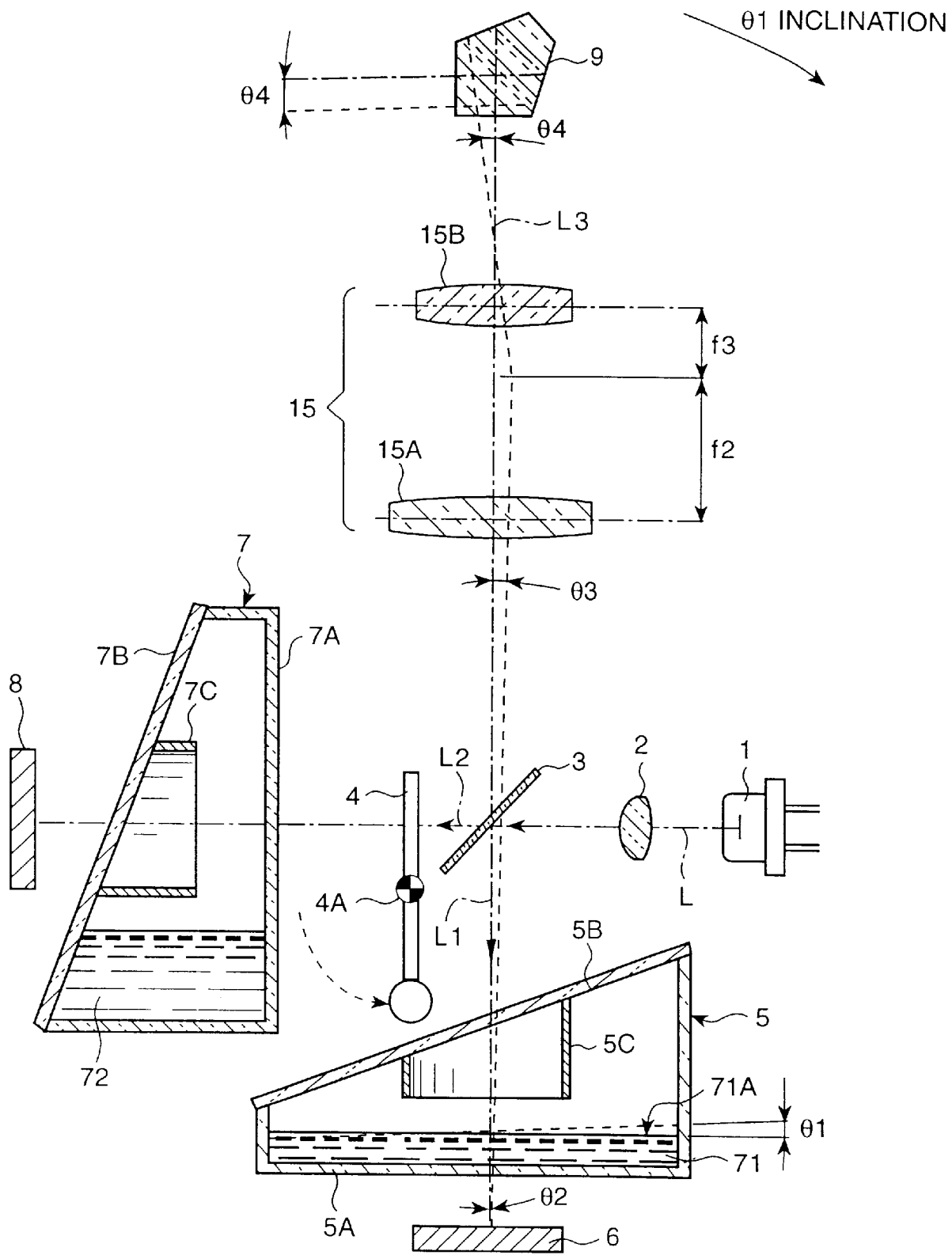
FIG. 7 is a vertical cross-sectional view of the key components of the reference light generator according to the third embodiment of the present invention showing the case in which the reference light generator is used to determine the degree of horizontality.
Figure 8:
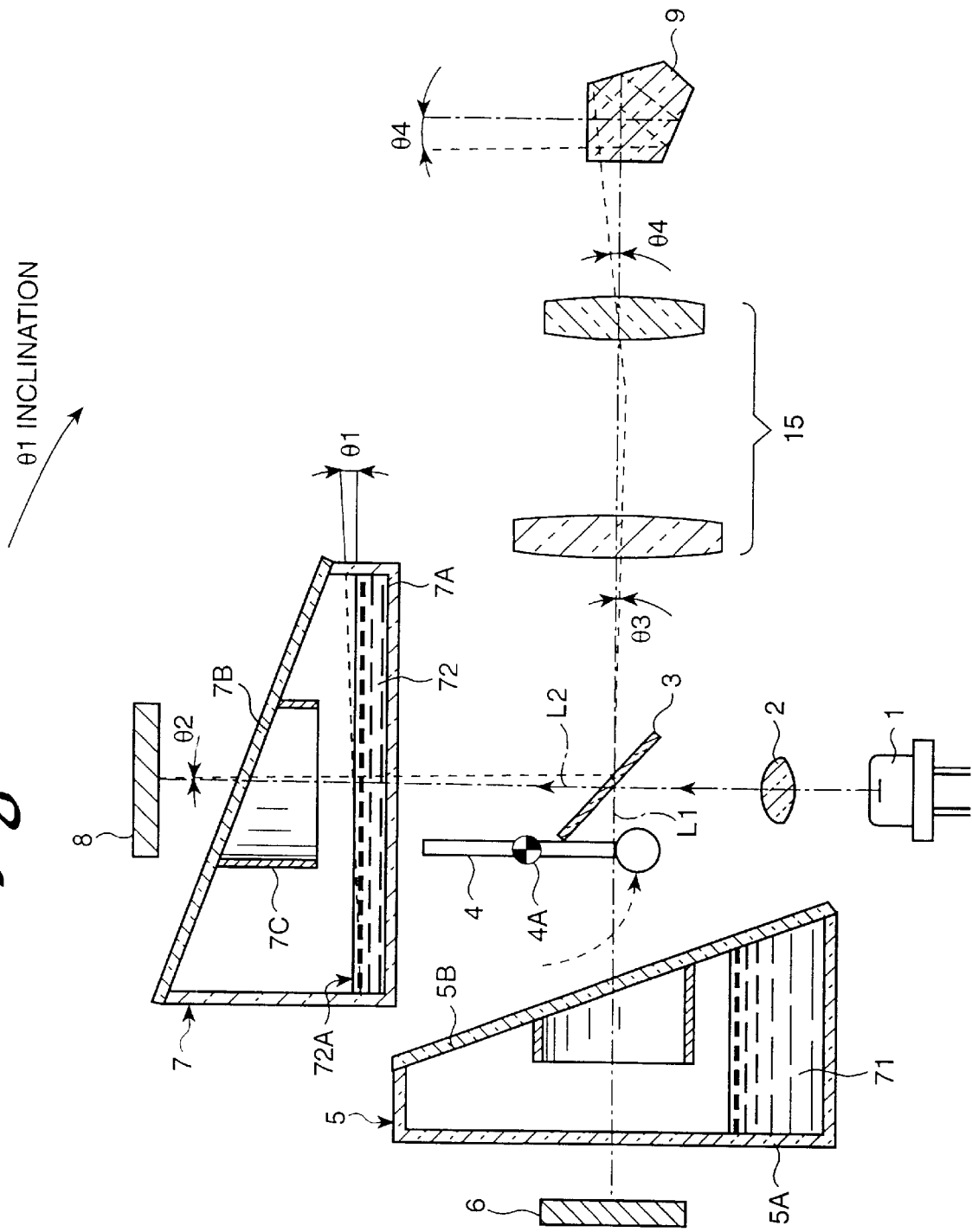
FIG. 8 is a vertical cross-sectional view of the key components of the reference light generator according to the third embodiment of the present invention showing the case in which the reference light generator is used to determine the degree of verticality.

Next, with reference to FIGS. 7 and 8, the third embodiment of the present invention will be explained. FIGS. 7 and 8 are vertical cross-sectional views showing the key components of the reference light generator according to the third embodiment of the present invention. FIG. 7 shows the case in which the reference light generator is used to determine the degree of horizontality. FIG. 8 shows the case in which the reference light generator is used to determine the degree of verticality. The reference light generator shown in FIG. 8 is installed by rotating the reference light generator shown in FIG. 7 by 90 degrees in the clockwise direction around a horizontal axis perpendicular to the page plane. It should be noted that, in FIGS. 7 and 8, the same reference codes are used for the same components that are used in FIGS. 3 and 4. Thus, such reference codes will not be explained, and the differences between the present embodiment and the second embodiment will be explained in particular.

In what follows, the differences between the present embodiment and the second embodiment will be explained with reference to FIG. 7. The reference light generator according to the third embodiment is equipped with a rotation-type pentagonal prism 9 in place of the conic mirror 10 that is used in the reference light generator according to the second embodiment, and a Kepler-type telescope (angle magnification optical system) 15 that is installed vertically above the half mirror 3. Telescope 15 includes a lens 15A and a lens 15B having focal lengths f2 and f3, respectively. The ratio between the two focal lengths is determined in accordance with the following equation.

$$f2:f3=1.25:1 \qquad \text{Equation (3)}$$

Thus, the angular magnification power of telescope 15 is set to 1.25. In addition, the refractive indices of the silicon oils 71 and 72 that are used in the reference light generator according to the third embodiment are set to 1.4.

Still with reference to FIG. 7, the case in which the present reference light generator is used for examining a degree of horizontality will be explained. It should be noted that the operations of the half mirror 3, the movable light shielding plate 4, the silicon oil 71, and the like will not be explained here since they have already been explained in the second embodiment. Here, a process, during which the laser beam is bent to by the deflection angle θ3 with respect to the optical axis of light L1 initially enters the lens 15A and the rotation-type pentagonal prism 9 finally scans the laser beam in a horizontal direction, will be explained in particular.

Since the refractive indices of the silicon oils 71 and 72 that are used in the reference light generator according to the present embodiment are set to 1.4, by substituting 1.4 for n in equation (2), the deflection angle θ3 can be expressed as follows.

$$\theta3=2(n-1)\ \theta1=0.8\ \theta1 \qquad \text{Equation (4)}$$

Then, telescope 15 magnifies the propagation direction angle of the laser beam, to which the deflection angle θ3=0.8 θ1 is added, by an angular magnification power of 1.25. Moreover, telescope 15 bends the laser beam by a deflection angle θ4 in the counterclockwise direction. The deflection angle θ4 can be expressed by the following equation.

$$\theta4=1.25\times\theta3=1.25\times0.8\ \theta1=\theta1 \qquad \text{Equation (5)}$$

In other words, the prism effect of the silicon oil 71 and telescope 15 corrects the inclination angle θ1 of the reference light generator, and the laser beam is transmitted vertically upward. Then, the rotation-type pentagonal prism 9 converts this laser beam into a laser beam having a horizontal scan plane. In this way, the degree of horizontality can be determined.

With reference to FIG. 8, the case in which the reference light generator according to the third embodiment is used to determine the degree of verticality will be explained. In FIG. 8, by the gravity, the silicon oils 71 and 72 that are sealed in the transparent containers 5 and 7, respectively, are moved toward the bottoms of the containers 5 and 7, respectively. On the other hand, the movable light shielding plate 4 is rotated in the counterclockwise direction by 90 degrees about its rotation axis.

Next, the optical path of the laser beam will be explained. However, it should be noted that the operations of the half mirror 3, the movable light shielding plate 4, the silicon oil 71, and the like in the reference light generator shown in FIG. 8 will not be explained here since they have already been explained in the second embodiment. Here, a process, during which the laser beam is bent by the deflection angle θ3 with respect to the optical axis of light L1 initially enters telescope 15 and the rotation-type pentagonal prism 9 finally converts the laser beam into a light having a vertical scan plane, will be explained in particular.

Since the refractive index of the silicon oil 72 that is used in the reference light generator shown in FIG. 8 is also set to 1.4, when the laser beam enters the angle magnification optical system 15, the deflection angle θ3 becomes θ3=0.8θ1. Then, telescope 15 bends the laser beam by a deflection angle θ4=1.25θ3=θ1 in the counterclockwise direction, corrects the inclination of the reference light generator, and transmits the light in a horizontal direction. Finally, the rotation-type pentagonal prism 9 converts the laser beam into a light having a vertical scan plane.

So far, in the explanation of the first through third embodiments, the configuration of the movable light shielding plate 4 is pendulum-like. However, the configuration of the movable light shielding plate 4 is not restricted to this type. For example, two light shielding plates may be installed on the optical paths L1 and L2 independently so that they can be opened and closed by a spring or the like. By adopting such a configuration, one of the light shielding plates can be opened and the other can be closed in response to the installation position of the reference light generator, by adjusting the balance among the masses of the light shielding plates, the force of the springs, and the gravity.

In the above-discussed third embodiment, the unwanted portion of the laser beam that is split by the half mirror 3 is blocked by the movable light shielding plate 4, and only the remaining necessary portion of the laser beam is emitted from the reference light generator. However, an example, in which a PBS, a movable ½ wavelength plate, and a ¼ wavelength plate are used in place of the half mirror 3 and the movable light shielding plate 4, will be explained with reference to FIGS. 9 and 10.

Figure 9:
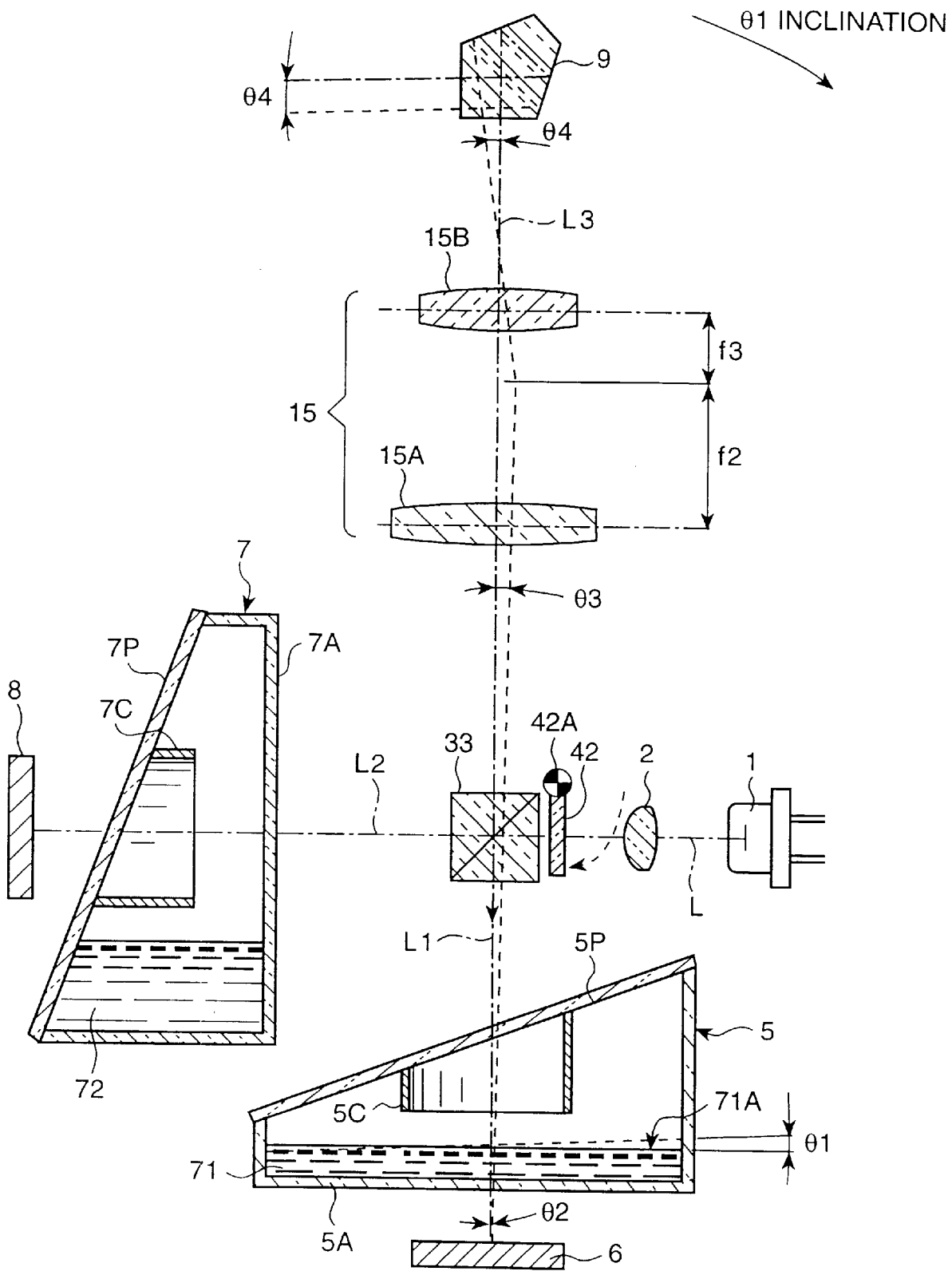
FIG. 9 is a vertical cross-sectional view of the key components of an alternative example of the reference light generator according to the third embodiment of the present invention showing the case in which the reference light generator is used to determine the degree of horizontality.
Figure 10:
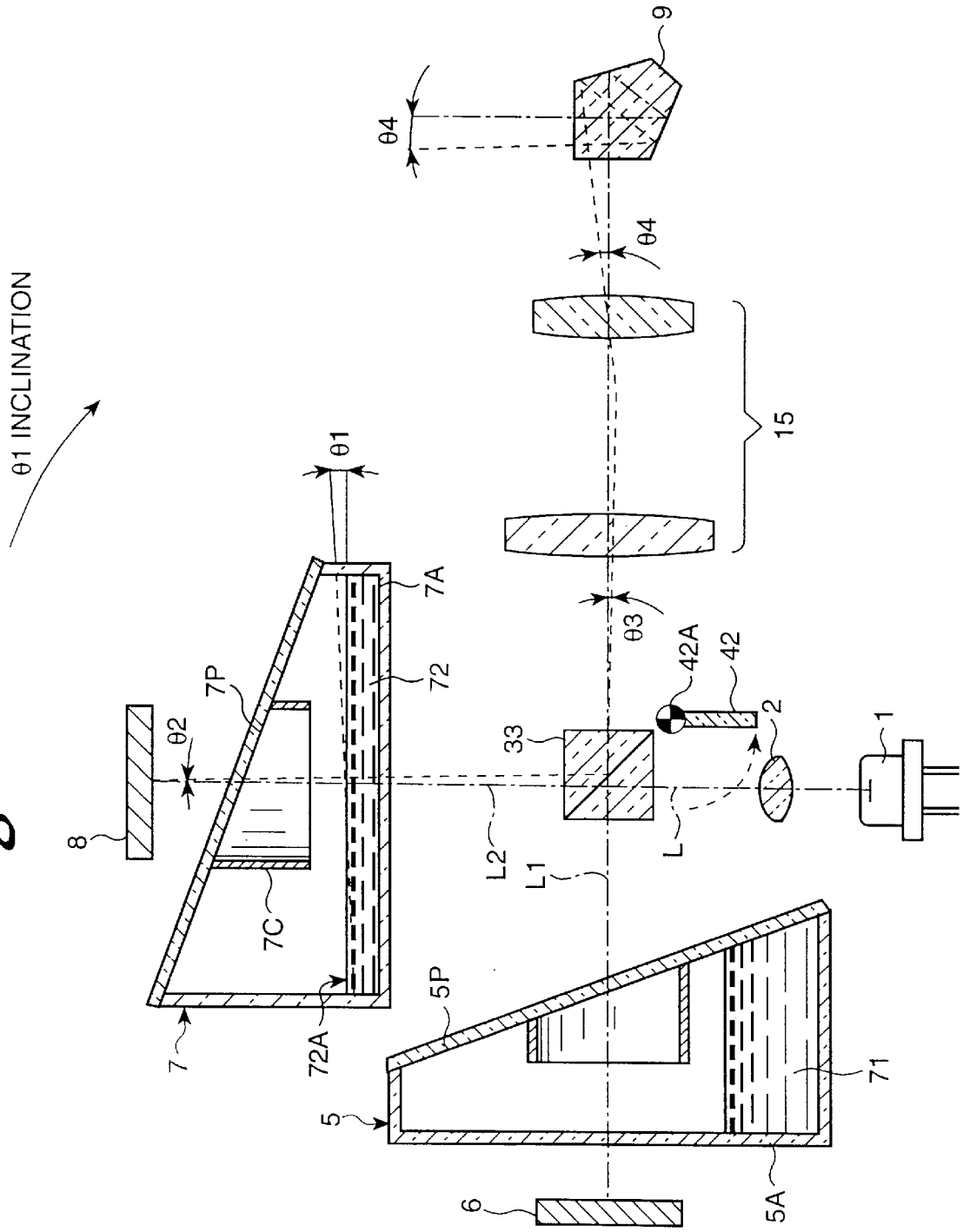
FIG. 10 is a vertical cross-sectional view of the key components of an alternative example of the reference light generator according to the third embodiment of the present invention showing the case in which the reference light generator is used to determine the degree of verticality.

FIG. 9 shows the case in which the reference light generator is used for examining a degree of horizontality. FIG. 10 shows the case in which the reference light generator is used to determine the degree of verticality. The reference light generator shown in FIG. 10 is installed by rotating the reference light generator shown in FIG. 9 by 90 degrees in the clockwise direction around a horizontal axis perpendicular to the page plane. The differences between the reference light generator shown in FIGS. 7 and 8 and the reference light generator shown in FIGS. 9 and 10 are the following.

The half mirror 3 shown in FIGS. 7 and 8 is replaced by a PBS 32. The movable light shielding plate 4 shown in FIGS. 7 and 8 is replaced by a movable ½ wavelength plate 42. The light transmission plane 5B shown in FIGS. 7 and 8 is replaced by a movable ¼ wavelength plate 5P. The light transmission plane 7B shown in FIGS. 7 and 8 is replaced by a movable ¼ wavelength plate. These differences will now be explained in the following.

In FIG. 9, the movable half wavelength plate 42 is supported by the rotation axis 42A so as to be freely rotatable around the rotation axis 42A. This movable half wavelength plate 42 is positioned so as to intersect the optical path L of the laser beam by the gravity when the reference light generator is used to determine the degree of horizontality as shown in FIG. 9. Then, the laser beam that advances along the optical path L has its polarization plane rotated by 90 degrees when passing through the movable half wavelength plate 42. A linearly polarized laser beam is emitted from the laser diode 1, and advances along the optical path L. The polarization plane of the laser diode 1 is adjusted so that the PBS 32 will reflect the linearly polarized laser beam downward on the drawing after the laser beam transmits the movable half wavelength plate 42.

The laser beam that is reflected downward on the drawing by the PBS 32, and advances along the optical path of light L1 passes through the ¼ wavelength plate 5P, the silicon oil 71, and the light transmission plane 5A, is reflected by the mirror 6, and passes through the light transmission plane 5A, the silicon oil 71, and the ¼wavelength plate 5P again. During this process, the laser beam is given a deflection angle θ3, and has its polarization plane rotated by 90 degrees. In this way, the laser beam, to which the deflection angle θ3 is given, advances straight inside the PBS 32. Then, telescope 15 bends the laser beam by a deflection angle θ4=1.25θ3=θ1, corrects the inclination of the reference light generator, and transmits the laser beam in a vertical direction. Then, the rotation-type pentagonal prism 9 converts the laser beam into a light having a horizontal scan plane.

When this reference light generator is used for determining the degree of verticality as shown in FIG. 10, the movable ½ wavelength plate 42 rotates around the rotation axis 42A in the counterclockwise direction by the gravity, and withdraws from the optical path L of the laser beam. Hence, since the laser beam enters the PBS 32 without having its polarization plane rotated, the laser beam passes through the PBS 32 and advances straight. Then, the laser beam passes through the light transmission plane 7A, the silicon oil 72, and the ¼ wavelength plate 7P, is reflected by the mirror 8, and passes through the ¼ wavelength plate 7P, the silicon oil 72, and the light transmission plane 7A again. During this process, just as has been explained with reference to FIG. 8, the laser beam is bent by a deflection angle θ3 with respect to the optical path L2. Further, during this process, when the laser beam reciprocates through the ¼ wavelength plate 7P, the polarization plane of the laser beam is rotated by 90 degrees. Then, the PBS reflects the laser beam to the right on the drawing, telescope 15 bends the laser beam by a deflection angle θ4=1.25θ3=θ1 in the counterclockwise direction, corrects the inclination of the reference light generator, and transmits the laser beam in a horizontal direction. Then, the rotation-type pentagonal prism 9 converts the laser beam into a light having a vertical scan plane.

By adopting the structure shown in FIGS. 9 and 10 for the reference light generator according to the third embodiment, when the laser beam is reflected by the half mirror 3 in the reference light generator shown in FIGS. 7 and 8, and when the laser beam passes through the half mirror 3, the light amount loss of the laser beam can be reduced. Thus, the laser beam that is emitted from the laser diode 1 can be efficiently guided out of the reference light generator.

Fourth Embodiment

Figure 11:
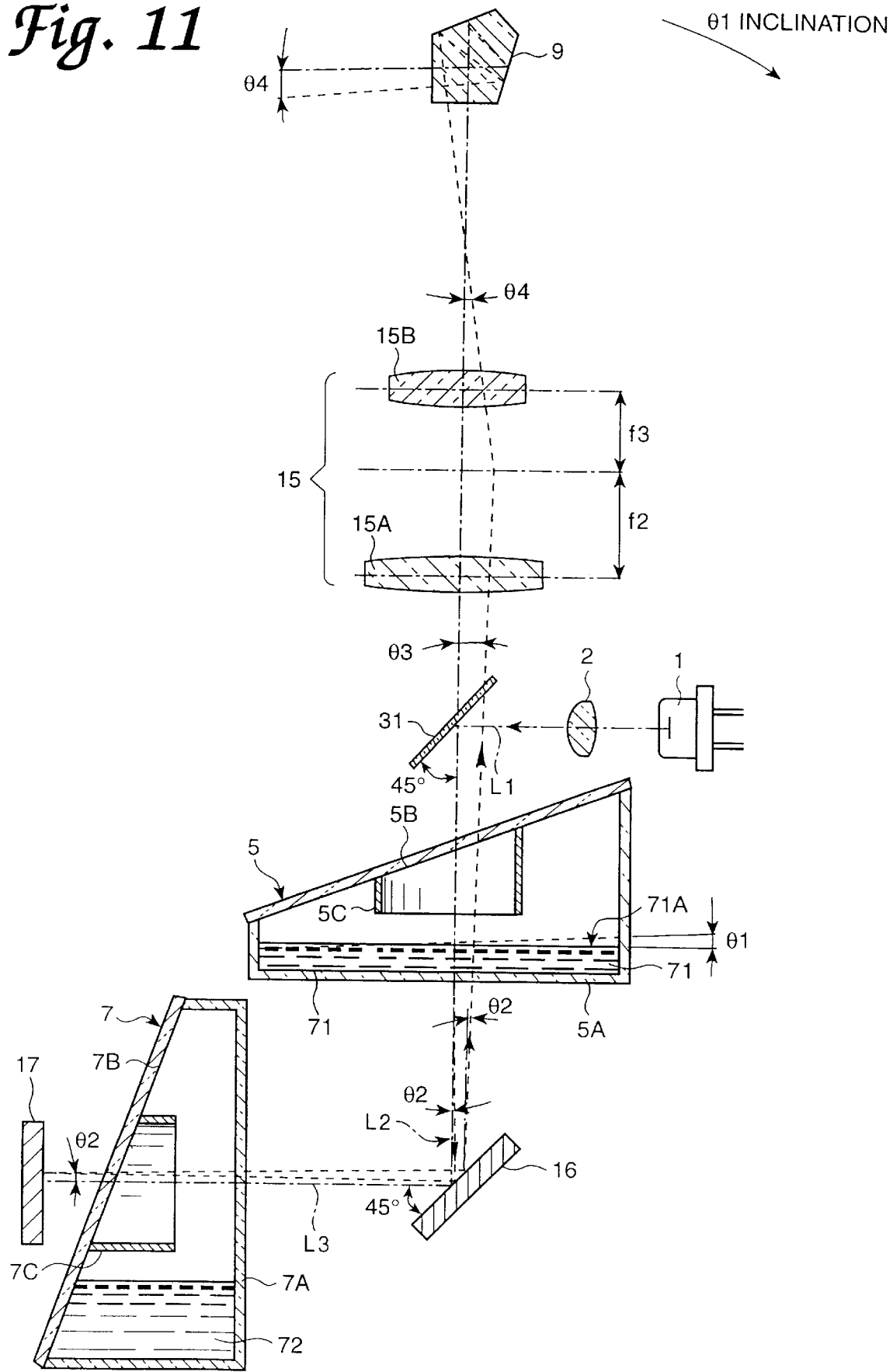
FIG. 11 is a vertical cross-sectional view of the key components of the reference light generator according to the fourth embodiment of the present invention showing the case in which the reference light generator is used to determine the degree of horizontality.
Figure 12:
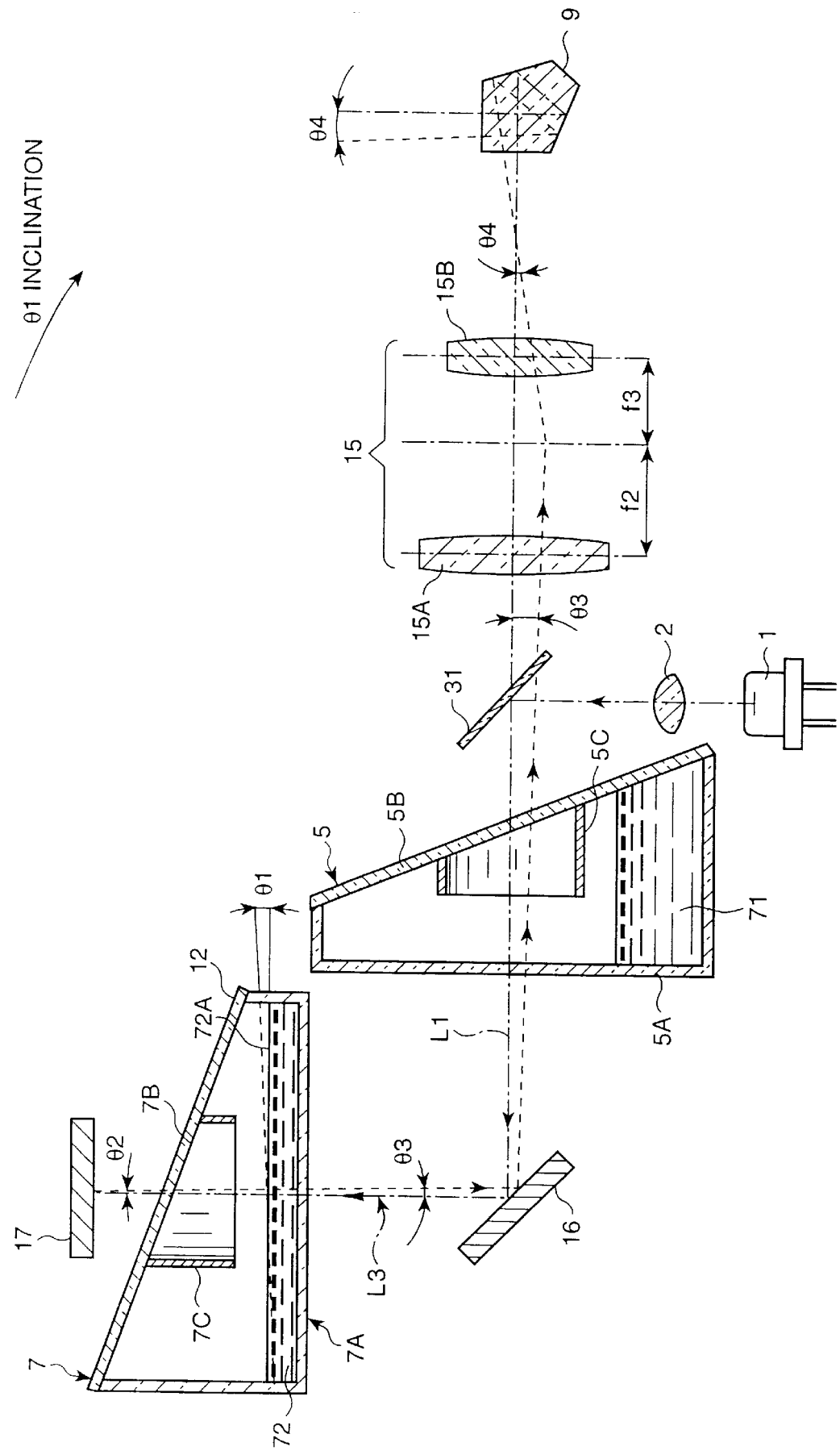
FIG. 12 is a vertical cross-sectional view of the key components of the reference light generator according to the fourth embodiment of the present invention showing the case in which the reference light generator is used to determine the degree of verticality.

Next, with reference to FIGS. 11 and 12, the fourth embodiment of the present invention will be explained. FIGS. 11 and 12 are vertical cross-sectional views showing the key components of the reference light generator according to the fourth embodiment of the present invention. FIG. 11 shows the case in which the reference light generator is used to determine the degree of horizontality. FIG. 12 shows the case in which the reference light generator is used to determine the degree of verticality. The reference light generator shown in FIG. 12 is installed by rotating the reference light generator shown in FIG. 11 by 90 degrees in the clockwise direction around a horizontal axis perpendicular to the page plane. It should be noted that, in FIGS. 11 and 12, the same reference codes are used for the same components that are used in FIGS. 1 and 2 that show the reference light generator according to the first embodiment. Thus, such reference codes will not be explained.

With reference to FIG. 11, the structure of the reference light generator according to the fourth embodiment will be explained. The reference light generator shown in FIG. 11 includes a half mirror 31, which is installed so as to bend the laser beam that is emitted in a horizontal direction from the laser diode 1 and is transformed into a parallel light by the collimator lens 2 vertically downward, and so as to have the laser beam propagate along the optical axis L2. A transparent container 5 is installed so as to have the light transmission plane 5A intersect the optical path L2 orthogonally, so as to have the light transmission plane 5B positioned at the top of the container 5. Mirror 16 bends by 90 degrees the laser beam that advances along the optical path L2, so as to guide the laser beam along an optical path L3. A transparent container 7 is installed so as to have the light transmission plane 7A intersect the optical path L3 orthogonally, so as to have the light transmission plane 7B positioned on the left side. Telescope 15 is installed on the optical path of light L1 above the half mirror 31. A pentagonal prism 9 which reflects in a horizontal direction the laser beam that advances in a vertical direction and causes the laser beam to generate a horizontal scan plane by rotating itself so as to have the optical path of light L1 and the rotation axis coincide. A mirror 17 is installed to the left of the transparent container 7 facing and parallel to the light transmission plane 7A.

Still with reference to FIG. 11, the operation of the reference light generator according to the fourth embodiment in the case in which it is used for examining a degree of horizontality. In FIG. 11 also, as in FIGS. 1 through 8, the liquid surface 71A of the silicon oil when the reference light generator is inclined by the angle θ1 in the clockwise direction on the page is represented with a broken line. In this apparatus shown in FIG. 11, the laser beam, which is emitted from the laser diode 1 and is transformed into a parallel light by the collimator lens 2, is guided downward by the half mirror 31, and advances along the optical path L2. Then, the laser beam passes through the light transmission plane 5B, the silicon oil 71, the light transmission plane 5A, the mirror 16, the light transmission plane 7A, and the light transmission plane 7B, and reaches the mirror 17. The mirror 17 reflects the laser beam. Then, the laser beam passes through the light transmission plane 7B, the light transmission plane 7A, the mirror 16, the light transmission plane 5A, the silicon oil 71, and the light transmission plane 5B. Then, the laser beam advances upward. During this process, the prism effect of the silicon oil 71 bends the laser beam by a deflection angle θ3 in the clockwise direction with respect to the optical path of light L1.

In addition, when the laser beam passes through the angle magnification optical system 15, telescope 15 bends the laser beam by a deflection angle θ4 in the counterclockwise direction with respect to the optical path of light L1. In this case, the refractive index n of the silicon oil 71 is set to 1.4, and the angular magnification power of telescope 15 is set to 1.25 as in the third embodiment. Thus, the relation among the inclination angle θ1, the deflection angle θ3, and the deflection angle θ4 becomes θ4=θ1 in accordance with equations (4) and (5). In this way, the laser beam has the inclination angle θ1 of the reference light generator corrected, and is guided vertically upward. Finally, the rotation-type pentagonal prism 9 causes the laser beam to generate a horizontal scan plane.

Next, with reference to FIG. 12, the operation of the reference light generator according to the fourth embodiment in the case in which it is used to determine the degree of verticality. In FIG. 12, by the gravity, the silicon oils 71 and 72 that are sealed in the transparent containers 5 and 7, respectively, are moved toward the bottoms of the containers 5 and 7, respectively. In this FIG. 12 also, the liquid surface 72A of the silicon oil 72 when the reference light generator is inclined by the angle θ1 in the clockwise direction on the drawing is represented with a broken line.

The laser beam, which is emitted from the laser diode 1 and is transformed into a parallel light by the collimator lens 2, is reflected by the half mirror 31 to the left on the drawing. Then, the laser beam passes through the light transmission plane 5B, the light transmission plane 5A, and is reflected by the mirror 16. The reflected laser beam passes through the light transmission plane 7A, the silicon oil 72, and the light transmission plane 7B, and enters the mirror 17. Then, the laser beam is reflected by the mirror 17, and passes through the light transmission plane 7B, the silicon oil 72, the light transmission plane 7A, the mirror 16, the light transmission plane 5A, the light transmission plane 5B, and enters the angle magnification optical system 15. Before the laser beam hits the angle magnification optical system 15, the prism effect of the silicon oil 72 bends the laser beam by a deflection angle θ3 in the clockwise direction with respect to the optical path of light L1. Then, telescope 15 bends the laser beam by a deflection angle θ4 in the counterclockwise direction. In this case, the refractive index n of the silicon oil 72 is set to 1.4, and the angular magnification power of telescope 15 is set to 1.25. Thus, the relation among θ1, θ3, and θ4 becomes θ4=θ1 in accordance with equations (4) and (5). In this way, the laser beam has the inclination angle θ1 of the reference light generator corrected, and is guided in a horizontal direction. Finally, the laser beam can obtain a vertical scan plane by passing through the rotation-type pentagonal prism 9.

It should be noted that, when the third and fourth embodiments were explained, in the examples that were explained, the refractive indices of the silicon oils 71 and 72 were set to 1.4, and the magnification power of telescope 15 was set to 1.25. However, the above-mentioned relation θ4=θ1 can be maintained by setting the angular magnification power of telescope 15 in response to the refractive index of the silicon oil to be used. Hence, any silicon oil having any refractive index can be used.

Figure 13:
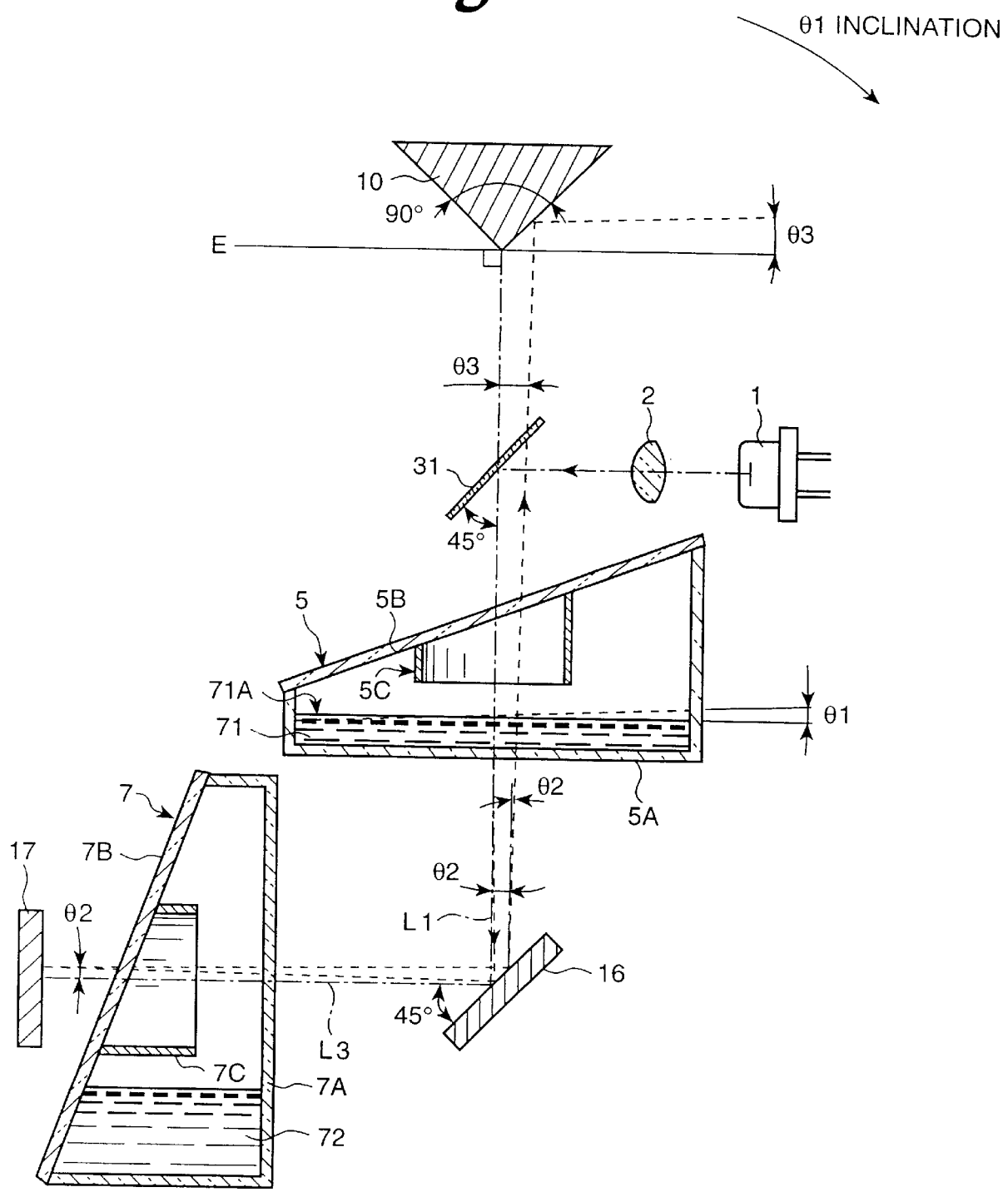
FIG. 13 is a vertical cross-sectional view of the key components of an alternative example of the reference light generator according to the fourth embodiment of the present invention showing the case in which the reference light generator is used to determine the degree of horizontality.
Figure 16:
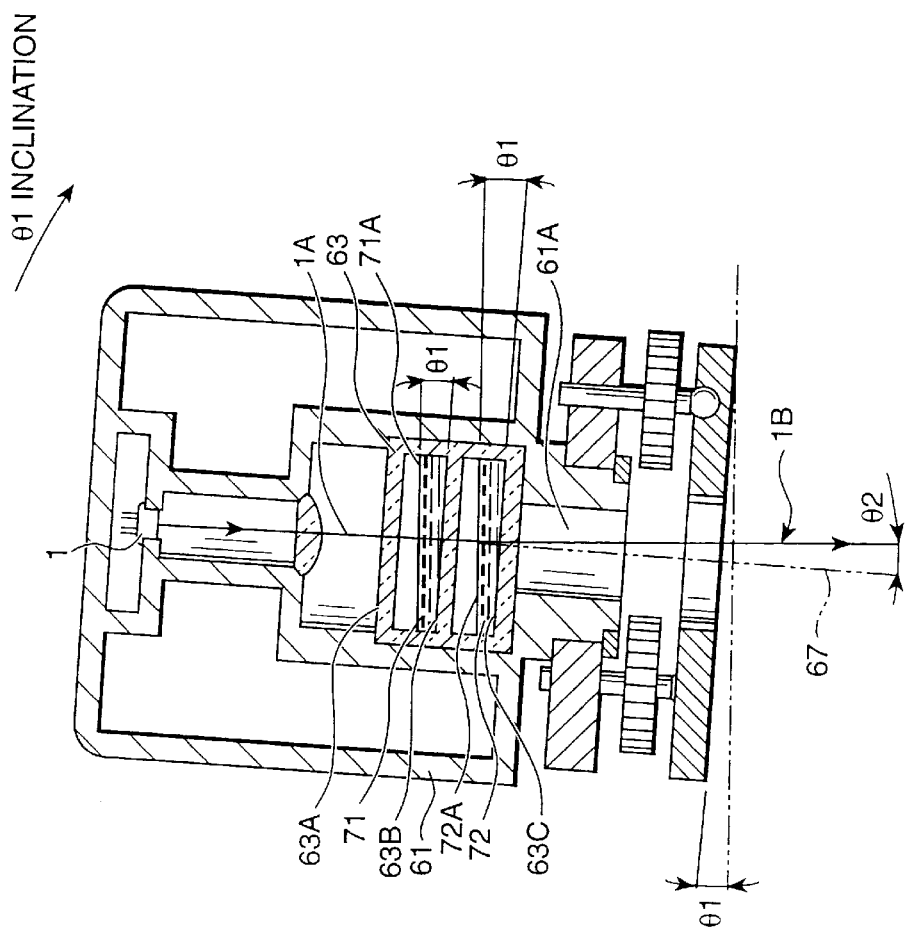
FIG. 16 (Prior Art) illustrates the automatic inclination correction operation of a laser projection surveying equipment having a reference light generator according to the prior art.

Further, as an alternative, in the fourth embodiment of the present invention, as shown in FIG. 13, telescope 15 can be eliminated by setting the refractive indices of the silicon oils 71 and 72 to 1.5; and using the conic prism 10 that has been explained in the second embodiment in place of the pentagonal prism 9.

In addition, as another alternative, in the fourth embodiment of the present invention, a PBS and a ¼ wavelength plate may be used in place of the half mirror 31. This example will be explained with reference to FIG. 14. The reference light generator shown in FIG. 14 is obtained by replacing the half mirror 31 by a PBS 32, and by installing a ¼ wavelength plate 41 between the mirror 17 and the transparent container 7. By employing this configuration, the light loss amount of the laser beam can be reduced when the laser beam is reflected by and passes through the half mirror 31 in the reference light generator shown in FIG. 11. By this configuration, the laser beam that is emitted from the diode 1 can be efficiently guided out of the reference light generator. In addition, when the laser beam is reflected by the light transmission plane (the light transmission plane 7A in the example shown in FIG. 14) of the other transparent container not involved in the inclination correction process (the transparent container 7 in the example shown in FIG. 14) and enters the PBS 32 again, the light does not pass through this PBS 32, but is reflected by the PBS 32. Hence, the laser beam does not escape from the reference light generator. In this way, only the laser beam that is refracted and reflected along the normal optical path is emitted from the reference light generator. As a result, a highly coherent scanning light can be obtained.

Further, in the above-discussed first through fourth embodiments, examples are explained in each of which a transparent silicon oil having a prescribed refractive index is used. However, the silicon oil may be replaced by any other viscous fluid having the same refractive index.

By simply installing only one apparatus in one of the vertical and horizontal positions, a reference light generator can be provided that: can project a reference light for examining a degree of horizontality and a degree of verticality; and has an excellent shock resistance and an excellent vibration resistance does not require precise adjustments during the manufacturing process.

An unwanted light beam can be blocked. Only the necessary light beam can be projected; and an excellent operational performance in examining a degree of horizontality and verticality can be achieved. In response to the installation position of the apparatus, without decreasing the reliability of the apparatus, and without raising the manufacturing cost.

By setting the angular magnification of the angular change optical system in response to the refractive index of the liquid sealed in one of the first and second containers, a liquid having any refractive index can be used.

Light from the light source can be projected in all directions along a reference plane that corresponds to the installation position of the reference light generator. In this way, a reference line can be marked on a wall surface or the like.

A light beam that is emitted from the light source can be efficiently emitted out of the reference light generator without reducing the reliability of the reference light generator. Moreover, a reference light generator having an excellent energy saving performance that is achieved by suppressing the emission power of the light source, an excellent vibration resistance and an excellent shock resistance, can be provided.

The optical path selection means in the reference light generator according to the invention described in claim 1 can be eliminated. By simply installing one reference light generator in one of the vertical and horizontal positions, the reference light generator can be used to determine the degree of verticality and the degree of horizontality.

The reference light generator can be downsized and the manufacturing cost can be reduced by simplifying the optical paths and reducing the number of constitutive components. In particular, the light that is emitted from the light source can be efficiently emitted out of the reference light generator. Moreover, a reference light generator having an excellent energy saving performance that is achieved by suppressing the emission power of the light source can be provided.

The degree of freedom of the refractive index of the liquid to be used can be increased by correcting the inclination of the light by setting the angular magnification power in response to the refractive index of the liquid that is sealed inside the containers.

The laser beam from the light source can be converted into a light that scans the reference plane. In this way, a straight line-shaped light can be projected onto a wall surface or the like.

The inclination of the laser beam can be corrected without using the angle changing means.

What is claimed is:

1. A reference light generator comprising:
   a light source;
   first and second sealed containers installed orthogonal to each other in a vertical plane, each containing a liquid having a free liquid surface;
   a first reflector installed next to the first container for transmitting light that passes through the first container back to the first container again;
   a second reflector installed next to the second container for transmitting light that passes through the second container back to the second container again;
   an optical path guiding means for:
      splitting the light that is emitted from the light source into a first light that travels toward the first container and a second light that travels toward the second container; and
      guiding:
         the first light, which passes through the first container, is reflected by the first reflector, and passes through the first container again; and
         the second light, which passes through the second container, is reflected by the second reflector, and passes through the second container again; so as to have the first light and the second light transmitted in the same direction; and
   an optical path selecting means for selectively blocking one of the first light and the second light; wherein the reference light generator is installable in a first position and in a second position that is achieved by rotating the reference light generator by 90 degrees from the first position around a horizontal axis, such that:
      in the first position, the first light passes through only the liquid that is sealed in the first container;
      in the second position, the second light passes through only the liquid that is sealed in the second container;
      the optical path selecting means blocks the light that does not pass through the liquid that is sealed in the containers.

2. A reference light generator claimed in claim 1, wherein the optical path selecting means operates by the gravity, and blocks the optical path that leads to one of the first and second containers.

3. A reference light generator claimed in claim 1 further comprising an angle changing means for changing a propagation direction angle of the light that is guided by the optical path guiding means.

4. A reference light generator comprising:
   a light source;
   first and second sealed containers installed orthogonal to each other in a vertical plane, containing a liquid having a free liquid surface;
   a first reflector, installed next to the first container, for transmitting a light that passes through the first container back to the first container again;
   a second reflector, installed next to the second container, for transmitting a light that passes through the second container back to the second container again;
   a first wavelength plate for rotating by a prescribed angle the polarization plane of light that passes through the first container;
   a second wavelength plate for rotating by a prescribed angle the polarization plane of the light that passes through the second container;
   a movable wavelength plate that:
      is removable from and installable on the optical path of light emitted from the light source; and
      rotates the polarization plane of the transmitting light by a prescribed angle when the movable wavelength plate is installed in the optical path;
   a polarized optical path guiding means for guiding:
      light from the light source to the first container when the movable wavelength plate is installed on the optical path;
      light from the light source to the second container when the movable wavelength plate is removed from the optical path; and
         the first light, which passes through the first container and the first wavelength plate, is reflected by the first reflecting means, and passes through the first container and the first wavelength plate again; and
         the second light, which passes through the second container and the second wavelength plate, is reflected by the second reflecting means, and passes through the second container and the second wavelength plate again;
   so as to have the first light and the second light transmitted in the same direction;
   wherein, the reference light generator is installable in a first position and in a second position that is achieved by rotating the reference light generator by 90 degrees axis from the first position around a horizontal, such that:
      in the first position, the movable wavelength plate is installed on the optical path, and the light that is emitted from the light source passes through only the liquid that is sealed in the first container;
      in the second position, the movable wavelength plate is removed from the optical path, and the light that is emitted from the light source passes through only the liquid that is sealed in the second container.

5. A reference light generator claimed in claim 4, wherein, the movable wavelength plate, which operates by gravity, is installable on and removable from the optical path.

6. A reference light generator claimed in claim 4, wherein:
   the phase difference of the first and second wavelength plates is ¼ wavelength;
   the phase difference of the movable wavelength plate is ½ wavelength; and
   the polarized optical path guiding means comprises a polarization beam splitter.

7. A reference light generator claimed in claim 4, further comprising an angle changing means for changing a propagation direction angle of the light that is guided by the polarized optical path guiding means.

8. A reference light generator comprising:

a light source;

first and second sealed containers, installed orthogonal to each other on a vertical plane, each containing a liquid having a free liquid surface; and a reflecting means for guiding a light that is emitted from the light source, whereby the light is guided so as to pass through the first container and the second container in this order, so as to be reflected by the reflector, to pass through the second container again, and to pass through the first container again, wherein:

the reference light generator is installable in a first position and in a second position that is achieved by rotating the reference light generator by 90 degrees from the first position around a horizontal axis, such that:

in the first position, the light that is emitted from the light source passes through only the liquid that is sealed in the first container; and in the second position, the light that is emitted from the light source passes through only the liquid that is sealed in the second container.

9. A reference light generator claimed in claim 8, further comprising an optical path switching means for transmitting the light that re-passes through the first container and is transmitted from the first container, wherein the reflector:

reflects a light that is emitted from the light source; and guides the light so as to transmit the light through the first and second containers.

10. A reference light generator claimed in claim 8, wherein the optical path switching means comprises a polarization beam splitter and a wavelength plate.

11. A reference light generator claimed in claim 9, further comprising an angle changing means for changing the propagation direction angle of the light that passes through the optical path switching means.

12. A reference light generator according to claim 1 wherein the refractive indices of the liquids that are sealed in the first and second containers are substantially 1.5.

13. A reference light generator according to claim 4 wherein the refractive indices of the liquids that are sealed in the first and second containers are substantially 1.5.

14. A reference light generator according to claim 8, wherein the refractive indices of the liquids that are sealed in the first and second containers are substantially 1.5.

* * * * *